US008185306B2

(12) United States Patent
Adachi

(10) Patent No.: US 8,185,306 B2
(45) Date of Patent: May 22, 2012

(54) METHOD AND APPARATUS FOR TRANSMITTING POSITION INFORMATION ON A DIGITAL MAP

(75) Inventor: Shinya Adachi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 598 days.

(21) Appl. No.: 12/026,307

(22) Filed: Feb. 5, 2008

(65) Prior Publication Data

US 2008/0198043 A1 Aug. 21, 2008

Related U.S. Application Data

(63) Continuation of application No. 10/652,257, filed on Aug. 29, 2003, now Pat. No. 7,353,108, which is a continuation of application No. 10/169,639, filed as application No. PCT/JP02/00601 on Jan. 28, 2002, now Pat. No. 6,662,101.

(30) Foreign Application Priority Data

Jan. 29, 2001 (JP) .................................. 2001-020082

(51) Int. Cl.
*G01C 21/00* (2006.01)
*G08G 1/123* (2006.01)
(52) U.S. Cl. ........ 701/451; 701/450; 701/446; 701/534; 340/995.19
(58) Field of Classification Search .................. 701/400, 701/409, 410, 420, 445, 446, 533, 534, 451, 701/450; 340/988, 993, 995.19, 989
See application file for complete search history.

(56) References Cited

U.S. PATENT DOCUMENTS 4,040,740 A 8/1977 Handtmann et al.
4,063,237 A 12/1977 Nier et al.
(Continued)

FOREIGN PATENT DOCUMENTS

EP 0478438 B1 4/1992
(Continued)

OTHER PUBLICATIONS

Canadian Office Action dated Jun. 8, 2009.

*Primary Examiner* — Thomas Black
*Assistant Examiner* — Christine Behncke
(74) *Attorney, Agent, or Firm* — Pearne & Gordon LLP

(57) ABSTRACT

The invention purposes to provide a position information transmission method for accurately transmitting a position and a shape on a digital map with a small amount of data. In a position information transmission method of the invention, the transmitting side transmits road shape information to specify the target road section on a digital map and event information to specify an event position by using a relative position in the target road section and the receiving side performs map matching based on the road shape information to identify the target road section and identifies the event position in the target road section based on the event information is characterized in that the transmitting side intermittently selects nodes included in the target road section to include the coordinate data of the nodes in the road shape information for transmission, and that the receiving side performs map matching to determine the positions of the nodes included in the road shape information and obtains the road connecting the nodes by way of a route search to identify the target road section. It is thus possible to efficiently and accurately transmit an event position on a digital map.

12 Claims, 21 Drawing Sheets

U.S. PATENT DOCUMENTS

| | | |
|---|---|---|
| 4,151,656 A | 5/1979 | Hensley |
| 4,196,474 A | 4/1980 | Buchanan et al. |
| 4,251,797 A | 2/1981 | Bragas et al. |
| 4,304,487 A | 12/1981 | Odone et al. |
| 4,725,957 A | 2/1988 | Alberter et al. |
| 4,728,888 A | 3/1988 | Bauer et al. |
| 4,729,172 A | 3/1988 | Alberter et al. |
| 4,731,727 A | 3/1988 | Rauch et al. |
| 4,733,179 A | 3/1988 | Bauer et al. |
| 4,782,453 A | 11/1988 | Bauer et al. |
| 4,784,237 A | 11/1988 | Condne et al. |
| 4,807,127 A | 2/1989 | Tenmoku et al. |
| 4,807,264 A | 2/1989 | Bauer |
| 4,819,175 A | 4/1989 | Wuttke |
| 4,835,870 A | 6/1989 | Rauch et al. |
| 4,893,246 A | 1/1990 | Iihoshi et al. |
| 4,924,699 A | 5/1990 | Kuroda et al. |
| 4,930,888 A | 6/1990 | Freisleben et al. |
| 4,963,864 A | 10/1990 | Iihoshi et al. |
| 4,963,865 A | 10/1990 | Ichikawa et al. |
| 4,984,168 A | 1/1991 | Neukrichner et al. |
| 4,989,333 A | 2/1991 | Helldorfer et al. |
| 5,020,143 A | 5/1991 | Duckeck et al. |
| 5,021,962 A | 6/1991 | Helldorfer et al. |
| 5,040,122 A | 8/1991 | Neukirchner et al. |
| 5,046,011 A | 9/1991 | Kakihara et al. |
| 5,059,965 A | 10/1991 | Geiser |
| 5,067,082 A | 11/1991 | Nimura et al. |
| 5,095,532 A | 3/1992 | Mardus |
| 5,146,219 A | 9/1992 | Zechnall |
| 5,148,604 A | 9/1992 | Bantien |
| 5,173,691 A | 12/1992 | Sumner |
| 5,177,685 A | 1/1993 | Davis et al. |
| 5,182,555 A | 1/1993 | Sumner |
| 5,184,123 A | 2/1993 | Bremer et al. |
| 5,193,214 A | 3/1993 | Mardus et al. |
| 5,214,757 A | 5/1993 | Mauney et al. |
| 5,247,252 A | 9/1993 | Hamisch et al. |
| 5,261,279 A | 11/1993 | Wolf et al. |
| 5,279,040 A | 1/1994 | Kippelt et al. |
| 5,283,575 A | 2/1994 | Kao et al. |
| 5,307,278 A | 4/1994 | Hermans et al. |
| 5,311,195 A | 5/1994 | Mathis et al. |
| 5,332,180 A | 7/1994 | Peterson et al. |
| 5,351,539 A | 10/1994 | Ziegenbein et al. |
| 5,396,429 A | 3/1995 | Hanchett |
| 5,406,490 A | 4/1995 | Braegas |
| 5,416,711 A | 5/1995 | Gran et al. |
| 5,438,687 A | 8/1995 | Suchowerskyj et al. |
| 5,440,389 A | 8/1995 | Drabarek |
| 5,442,559 A | 8/1995 | Kuwahara et al. |
| 5,465,088 A | 11/1995 | Braegas |
| 5,473,930 A | 12/1995 | Gademann et al. |
| 5,487,009 A | 1/1996 | Hill |
| 5,488,559 A | 1/1996 | Seymour |
| 5,504,482 A | 4/1996 | Schreder |
| 5,508,917 A | 4/1996 | Siegle et al. |
| 5,515,042 A | 5/1996 | Nelson |
| 5,523,765 A | 6/1996 | Ichikawa |
| 5,602,542 A | 2/1997 | Widmann |
| 5,629,690 A | 5/1997 | Knoll |
| 5,659,476 A | 8/1997 | LeFebvre et al. |
| 5,703,293 A | 12/1997 | Zabler et al. |
| 5,710,566 A | 1/1998 | Grabow et al. |
| 5,736,941 A | 4/1998 | Schulte et al. |
| 5,742,923 A | 4/1998 | Odagawa |
| 5,745,865 A | 4/1998 | Rostoker et al. |
| 5,748,107 A | 5/1998 | Kersken et al. |
| 5,757,285 A | 5/1998 | Grabow et al. |
| 5,797,112 A | 8/1998 | Komatsu et al. |
| 5,812,069 A | 9/1998 | Albrecht et al. |
| 5,826,212 A | 10/1998 | Nagai |
| 5,828,322 A | 10/1998 | Eberhard |
| 5,839,087 A | 11/1998 | Sato |
| 5,842,146 A | 11/1998 | Shishido |
| 5,848,374 A * | 12/1998 | Wakabayashi et al. ....... 701/212 |
| 5,850,190 A | 12/1998 | Wicks et al. |
| 5,862,511 A | 1/1999 | Croyle et al. |
| 5,899,954 A | 5/1999 | Sato |
| 5,905,451 A | 5/1999 | Sakashita |
| 5,908,466 A | 6/1999 | Veugen et al. |
| 5,926,118 A | 7/1999 | Hayashida et al. |
| 5,933,094 A | 8/1999 | Goss et al. |
| 5,933,100 A | 8/1999 | Golding |
| 5,948,043 A | 9/1999 | Mathis |
| 5,974,356 A | 10/1999 | Doyle et al. |
| 5,977,885 A | 11/1999 | Watanabe |
| 5,990,809 A | 11/1999 | Howard |
| 5,995,023 A | 11/1999 | Kreft |
| 5,996,409 A | 12/1999 | Funk et al. |
| 6,002,981 A | 12/1999 | Kreft |
| 6,006,161 A | 12/1999 | Katou |
| 6,012,012 A | 1/2000 | Fleck et al. |
| 6,031,600 A | 2/2000 | Winner et al. |
| 6,035,253 A | 3/2000 | Hayashi et al. |
| 6,038,559 A | 3/2000 | Ashby et al. |
| 6,061,627 A | 5/2000 | Sato |
| 6,064,319 A | 5/2000 | Matta |
| 6,097,313 A | 8/2000 | Takahashi et al. |
| 6,104,480 A | 8/2000 | Matzo et al. |
| 6,107,940 A | 8/2000 | Grimm |
| 6,107,941 A | 8/2000 | Jones |
| 6,108,603 A | 8/2000 | Karunanidhi |
| 6,111,521 A | 8/2000 | Mulder et al. |
| 6,111,523 A | 8/2000 | Mee |
| 6,114,973 A | 9/2000 | Winner et al. |
| 6,115,668 A | 9/2000 | Kaneko et al. |
| 6,118,959 A | 9/2000 | Michlin |
| 6,137,564 A | 10/2000 | Schmidt et al. |
| 6,141,454 A | 10/2000 | Seymour et al. |
| 6,150,961 A | 11/2000 | Alewine et al. |
| 6,163,749 A * | 12/2000 | McDonough et al. ........ 701/208 |
| 6,163,752 A | 12/2000 | Sievers et al. |
| 6,169,955 B1 | 1/2001 | Fultz |
| 6,169,956 B1 | 1/2001 | Morimoto et al. |
| 6,178,377 B1 | 1/2001 | Ishihara et al. |
| 6,178,378 B1 | 1/2001 | Leibold |
| 6,192,314 B1 | 2/2001 | Khavakh et al. |
| 6,208,268 B1 | 3/2001 | Scarzello et al. |
| 6,212,473 B1 | 4/2001 | Stefan et al. |
| 6,223,125 B1 | 4/2001 | Hall |
| 6,230,099 B1 | 5/2001 | Fabian |
| 6,230,100 B1 | 5/2001 | Geier |
| 6,232,917 B1 | 5/2001 | Baumer et al. |
| 6,236,336 B1 | 5/2001 | Oliva et al. |
| 6,236,933 B1 | 5/2001 | Lang |
| 6,240,368 B1 | 5/2001 | Kreft |
| 6,244,111 B1 | 6/2001 | Funk |
| 6,249,740 B1 * | 6/2001 | Ito et al. ................. 701/200 |
| 6,249,754 B1 | 6/2001 | Neul et al. |
| 6,266,609 B1 | 7/2001 | Fastenrath |
| 6,281,807 B1 | 8/2001 | Kynast et al. |
| 6,281,808 B1 | 8/2001 | Glier et al. |
| 6,292,747 B1 | 9/2001 | Amro et al. |
| 6,293,024 B1 | 9/2001 | Fiebig et al. |
| 6,298,303 B1 | 10/2001 | Khavakh et al. |
| 6,314,360 B1 | 11/2001 | Becker |
| 6,314,365 B1 | 11/2001 | Smith |
| 6,321,158 B1 | 11/2001 | DeLorme et al. |
| 6,321,162 B1 | 11/2001 | Hessing |
| 6,324,467 B1 | 11/2001 | Machii et al. |
| 6,324,468 B1 | 11/2001 | Meis et al. |
| 6,324,888 B1 | 12/2001 | Schmidt et al. |
| 6,326,887 B1 | 12/2001 | Winner et al. |
| 6,327,532 B1 | 12/2001 | Black et al. |
| 6,333,703 B1 | 12/2001 | Alewine et al. |
| 6,334,089 B2 | 12/2001 | Hessing |
| 6,345,229 B1 | 2/2002 | Honkomp et al. |
| 6,430,499 B1 | 8/2002 | Nakano et al. |
| 6,438,561 B1 | 8/2002 | Israni et al. |
| 6,487,305 B2 | 11/2002 | Kambe et al. |
| 6,542,816 B1 * | 4/2003 | Ito et al. ................. 701/209 |
| 6,594,580 B1 * | 7/2003 | Tada et al. ................ 701/211 |
| 6,662,101 B2 | 12/2003 | Adachi |
| 6,763,301 B2 * | 7/2004 | McDonough ............... 701/208 |
| 2001/0001847 A1 | 5/2001 | Hessing |
| 2001/0007088 A1 | 7/2001 | Winter et al. |

| | | | | | | |
|---|---|---|---|---|---|---|
| 2001/0012981 | A1 | 8/2001 | Yamashita et al. | JP | 11-242166 | 9/1999 |
| 2001/0016796 | A1 | 8/2001 | Ata et al. | WO | 98-27530 | 6/1998 |
| 2001/0037177 | A1 | 11/2001 | Nishida et al. | WO | 98-45724 | 10/1998 |
| 2002/0128768 | A1 | 9/2002 | Nakano et al. | WO | 99-24787 | 5/1999 |

FOREIGN PATENT DOCUMENTS

| | | | | | |
|---|---|---|---|---|---|
| EP | 0875877 A2 | 11/1998 | WO | 99-56081 | 11/1999 |
| EP | 0932134 A1 | 7/1999 | WO | 99-56264 | 11/1999 |
| EP | 1022578 A2 | 7/2000 | WO | 00-08616 | 2/2000 |
| EP | 1098168 A2 | 5/2001 | WO | 00-49530 | 8/2000 |
| EP | 1102036 A1 | 5/2001 | WO | 00-50845 | 8/2000 |
| EP | 1122517 A2 | 8/2001 | WO | 01-18768 A1 | 3/2001 |
| EP | 1167923 A2 | 1/2002 | WO | 01-18769 A1 | 3/2001 |
| JP | 3-152700 | 6/1991 | WO | 01-50089 A1 | 7/2001 |
| JP | 7-65287 | 3/1995 | WO | 01-50437 A1 | 7/2001 |
| JP | 8-338736 | 12/1996 | WO | 01-75838 A1 | 10/2001 |
| JP | 9-326095 | 12/1997 | WO | 01-84081 A1 | 11/2001 |
| JP | 11-160091 A | 6/1999 | WO | 02-04894 A1 | 1/2002 |
| JP | 11-187456 A | 7/1999 | WO | 02-14788 A1 | 2/2002 |
| JP | 11-214068 | 8/1999 | WO | 02-16874 A1 | 2/2002 |

* cited by examiner

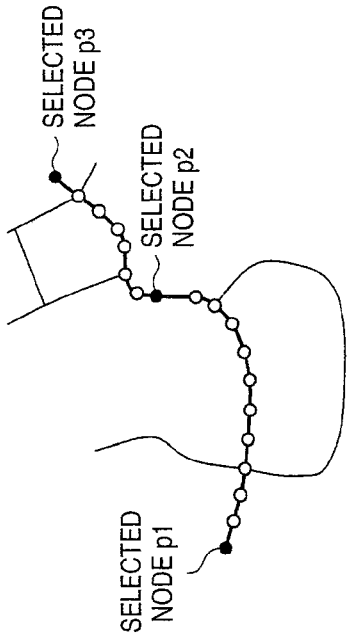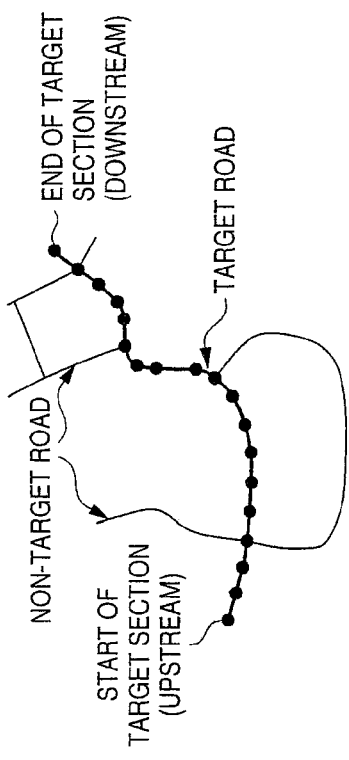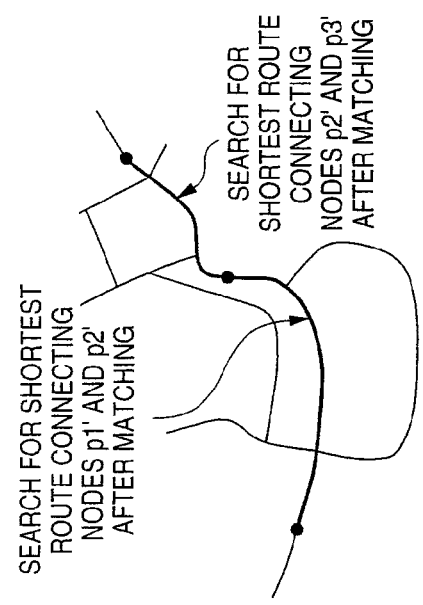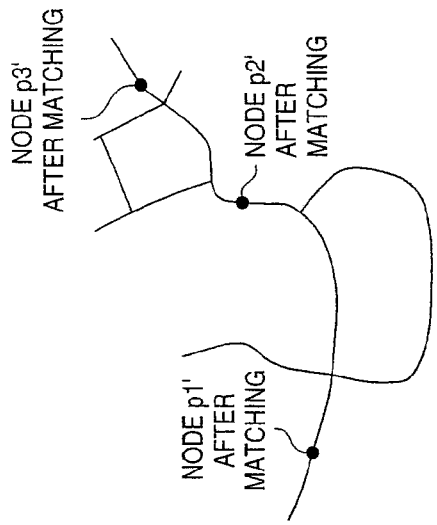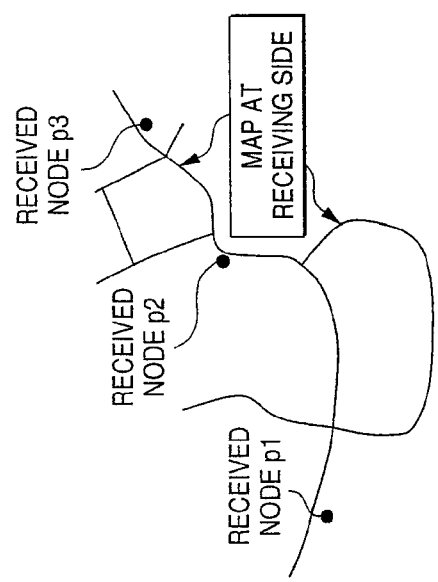

FIG. 4 (a)

| |
|---|
| VECTOR DATA TYPE (= ROAD) |
| ONE-WAY TRAFFIC DIRECTION (FORWARD/BACKWARD/NONE) |
| TOTAL NUMBER OF NODES |
| NODE NUMBER p1 |
| NODE 1 ABSOLUTE COORDINATE IN X DIRECTION (LONGITUDE) |
| NODE 1 ABSOLUTE COORDINATE IN Y DIRECTION (LATITUDE) |
| NODE NUMBER p2 |
| NODE 2 RELATIVE COORDINATE (x2) |
| NODE 2 RELATIVE COORDINATE (y2) |
| ...... |
| NODE NUMBER pn |
| NODE n RELATIVE COORDINATE IN X DIRECTION (LONGITUDE) |
| NODE n RELATIVE COORDINATE IN Y DIRECTION (LATITUDE) |

FIG. 4 (b)

| |
|---|
| VECTOR DATA TYPE (= ACCIDENT) |
| RELATED REGULATION INFORMATION (SINGLE-LANE TRAFFIC) |
| EVENT POSITION REFERENCE POINT NODE NUMBER (= p1) |
| DIRECTION FLAG (= FORWARD DIRECTION WITH RESPECT) |
| RELATIVE DISTANCE FROM REFERENCE POINT |
| ...... |
| EVENT NUMBER (= TRAFFIC ACCIDENT) |
| AVERAGE SPEED IN TRAFFIC CONGESTION (= 15km) |
| EVENT POSITION REFERENCE POINT NODE NUMBER (= pj) |
| DIRECTION FLAG (= BACKWARD DIRECTION WITH RESPECT TO NODE LINE) |
| RELATIVE DISTANCE FROM REFERENCE POINT (START POINT SIDE) |
| RELATIVE DISTANCE FROM REFERENCE POINT (END POINT SIDE) |

FIG. 4 (c)

| |
|---|
| VECTOR DATA TYPE (= ROAD) |
| ONE-WAY TRAFFIC DIRECTION (FORWARD/BACKWARD/NONE) |
| TOTAL NUMBER OF NODES |
| NODE NUMBER p1 |
| NODE 1 ABSOLUTE COORDINATE IN X DIRECTION (LONGITUDE) |
| NODE 1 ABSOLUTE COORDINATE IN Y DIRECTION (LATITUDE) |
| NODE NUMBER p2 |
| NODE 2 ABSOLUTE COORDINATE IN X DIRECTION (LONGITUDE) |
| NODE 2 ABSOLUTE COORDINATE IN Y DIRECTION (LATITUDE) |
| ...... |
| NODE NUMBER pn |
| NODE n ABSOLUTE COORDINATE IN X DIRECTION (LONGITUDE) |
| NODE n ABSOLUTE COORDINATE IN Y DIRECTION (LATITUDE) |

FIG. 4 (d)

| | |
|---|---|
| VECTOR DATA TYPE (= ROAD) | SECTION NUMBER #1 |
| ONE-WAY TRAFFIC DIRECTION (FORWARD/BACKWARD/NONE) | SECTION #1 LOWER LEFT POINT ABSOLUTE LONGITUDE |
| TOTAL NUMBER OF NODES | SECTION #1 LOWER LEFT POINT ABSOLUTE LATITUDE |
| NODE NUMBER p1 | SECTION #1 UPPER RIGHT POINT ABSOLUTE LONGITUDE |
| NODE 1 SECTION NUMBER | SECTION #1 UPPER RIGHT POINT ABSOLUTE LATITUDE |
| NODE 1 NORMALIZED COORDINATE IN X DIRECTION (LONGITUDE) | ⋮ |
| NODE 1 NORMALIZED COORDINATE IN Y DIRECTION (LATITUDE) | SECTION NUMBER #m |
| NODE NUMBER p2 | SECTION #m LOWER LEFT POINT ABSOLUTE LONGITUDE |
| NODE 2 SECTION NUMBER | SECTION #m LOWER LEFT POINT ABSOLUTE LATITUDE |
| NODE 2 NORMALIZED COORDINATE IN X DIRECTION (LONGITUDE) | SECTION #m UPPER RIGHT POINT ABSOLUTE LONGITUDE |
| NODE 2 NORMALIZED COORDINATE IN Y DIRECTION (LATITUDE) | SECTION #m UPPER RIGHT POINT ABSOLUTE LATITUDE |
| ⋮ | |
| NODE NUMBER pn | |
| NODE n SECTION NUMBER | |
| NODE n NORMALIZED COORDINATE IN X DIRECTION (LONGITUDE) | |
| NODE n NORMALIZED COORDINATE IN Y DIRECTION (LATITUDE) | |

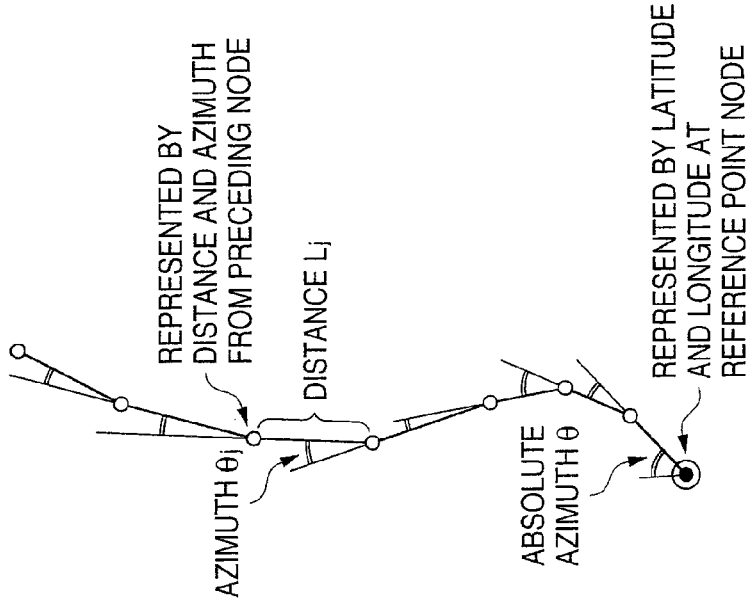

FIG. 5 (a)

| |
|---|
| VECTOR DATA TYPE (= ROAD) |
| ONE-WAY TRAFFIC DIRECTION (FORWARD/BACKWARD/NONE) |
| TOTAL NUMBER OF NODES |
| NODE NUMBER p1 |
| NODE 1 ABSOLUTE COORDINATE IN X DIRECTION (LONGITUDE) |
| NODE 1 ABSOLUTE COORDINATE IN Y DIRECTION (LATITUDE) |
| ROAD TYPE BETWEEN NODES p1 AND p2 (= NATIONAL HIGHWAY) |
| ROAD NUMBER BETWEEN NODES p1 AND p2 (= 256) |
| LINK TYPE BETWEEN NODES p1 AND p2 (= MAIN LINE) |
| NODE NUMBER p2 |
| NODE 2 RELATIVE COORDINATE IN X DIRECTION (LONGITUDE) |
| NODE 2 RELATIVE COORDINATE IN Y DIRECTION (LATITUDE) |
| ⋮ |
| NODE NUMBER pn |
| NODE n RELATIVE COORDINATE IN X DIRECTION (LONGITUDE) |
| NODE n RELATIVE COORDINATE IN Y DIRECTION (LATITUDE) |

FIG. 5 (b)

| |
|---|
| NODE NUMBER p1 |
| NODE TYPE (= INTERSECTION) |
| NAME (INTERSECTION/IC NAME) |
| NUMBER OF CONNECTING LINKS I4 OF p1 |
| ANGLE 1 BETWEEN CONNECTING LINKS OF p1 |
| ⋮ |
| ANGLE I4 BETWEEN CONNECTING LINKS OF p1 |
| ⋮ |
| NODE NUMBER pm |
| NODE TYPE (= INTERSECTION) |
| NAME (INTERSECTION/IC NAME) |
| NUMBER OF CONNECTING LINKS In OF pm |
| ANGLE 1 BETWEEN CONNECTING LINKS OF pm |
| ⋮ |
| ANGLE In BETWEEN CONNECTING LINKS OF p1 |

FIG. 13

| |
|---|
| VECTOR DATA TYPE (= ROAD) |
| ONE-WAY TRAFFIC DIRECTION (FORWARD/BACKWARD/NONE) |
| TOTAL NUMBER OF NODES |
| NODE NUMBER p1 |
| NODE 1 ABSOLUTE COORDINATE IN X DIRECTION (LONGITUDE) |
| NODE 1 ABSOLUTE COORDINATE IN Y DIRECTION (LATITUDE) |
| NODE 1 ABSOLUTE AZIMUTH (= ANGLE $\theta_1$ AT NODE p1) |
| NODE NUMBER p2 |
| NODE 2 RELATIVE COORDINATE IN X DIRECTION (LONGITUDE) |
| NODE 2 RELATIVE COORDINATE IN Y DIRECTION (LATITUDE) |
| NODE 2 RELATIVE AZIMUTH (= ANGLE $\theta_2$ AT NODE p2) |
| ⋮ |
| NODE NUMBER pn |
| NODE n RELATIVE COORDINATE IN X DIRECTION (LONGITUDE) |
| NODE n RELATIVE COORDINATE IN Y DIRECTION (LATITUDE) |
| NODE n RELATIVE AZIMUTH (= ANGLE $\theta_n$ AT NODE pn) |

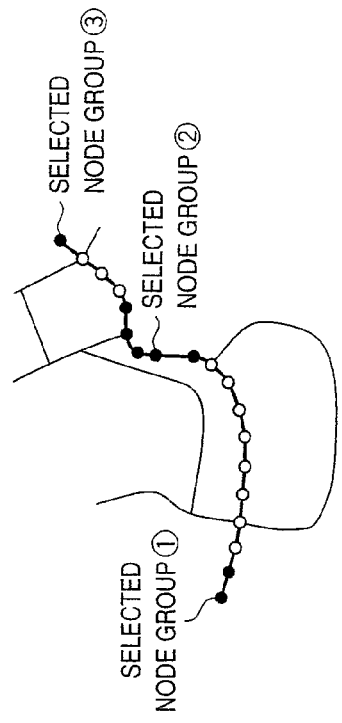
FIG. 14 (1)
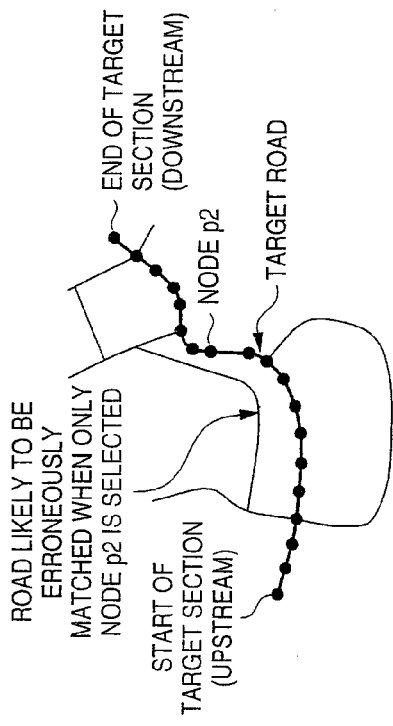
FIG. 14 (2)
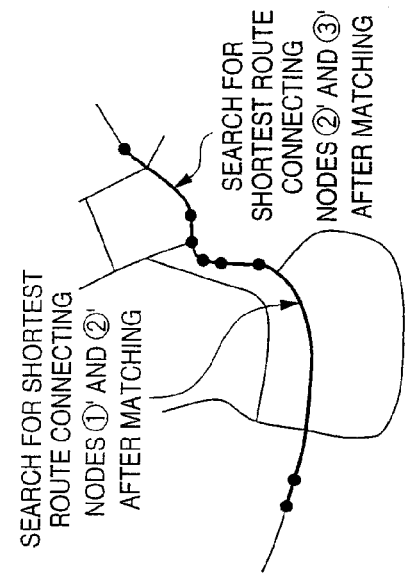
FIG. 14 (3)
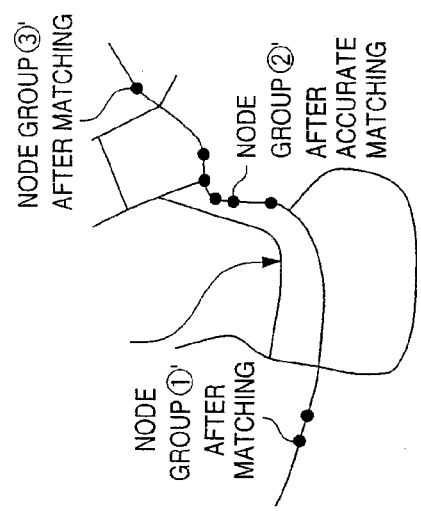
FIG. 14 (4)
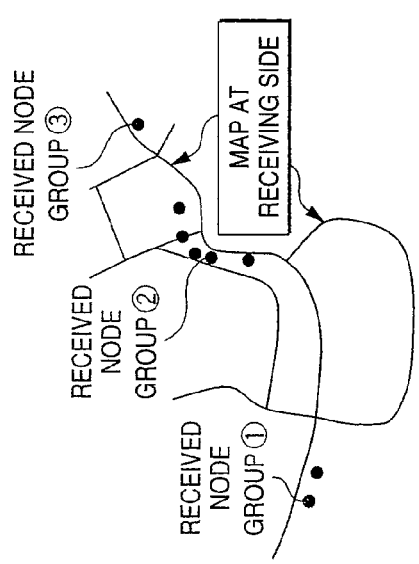
FIG. 14 (5)

FIG. 15

| |
|---|
| VECTOR DATA TYPE (= ROAD) |
| ONE-WAY TRAFFIC DIRECTION (FORWARD/BACKWARD/NONE) |
| TOTAL NUMBER OF NODES (n) |
| NUMBER OF NODES m CONSTITUTING NODE GROUP 1 |
| NODE NUMBER p1-1 |
| NODE 1-1 ABSOLUTE COORDINATE IN X DIRECTION (LONGITUDE) |
| NODE 1-1 ABSOLUTE COORDINATE IN Y DIRECTION (LATITUDE) |
| NODE 1-1 ABSOLUTE AZIMUTH (= ANGLE θ1-1 AT NODE p1-1) |
| ⋮ |
| NODE NUMBER p1-m |
| NODE 1-m RELATIVE COORDINATE IN X DIRECTION (LONGITUDE) |
| NODE 1-m RELATIVE COORDINATE IN Y DIRECTION (LATITUDE) |
| NODE 1-m RELATIVE AZIMUTH (= ANGLE θ1-m AT NODE p1-m) |
| ⋮ |
| NUMBER OF NODES s CONSTITUTING NODE GROUP n |
| NODE NUMBER pn-1 |
| NODE n-1 ABSOLUTE COORDINATE IN X DIRECTION (LONGITUDE) |
| NODE n-1 ABSOLUTE COORDINATE IN Y DIRECTION (LATITUDE) |
| NODE n-1 ABSOLUTE AZIMUTH (ANGLE θn-1 AT NODE pn-1) |
| ⋮ |
| NODE NUMBER pn-s |
| NODE n-s ABSOLUTE COORDINATE IN X DIRECTION (LONGITUDE) |
| NODE n-s ABSOLUTE COORDINATE IN Y DIRECTION (LATITUDE) |
| NODE n-s ABSOLUTE AZIMUTH (= ANGLE θn-s AT NODE pn-s) |

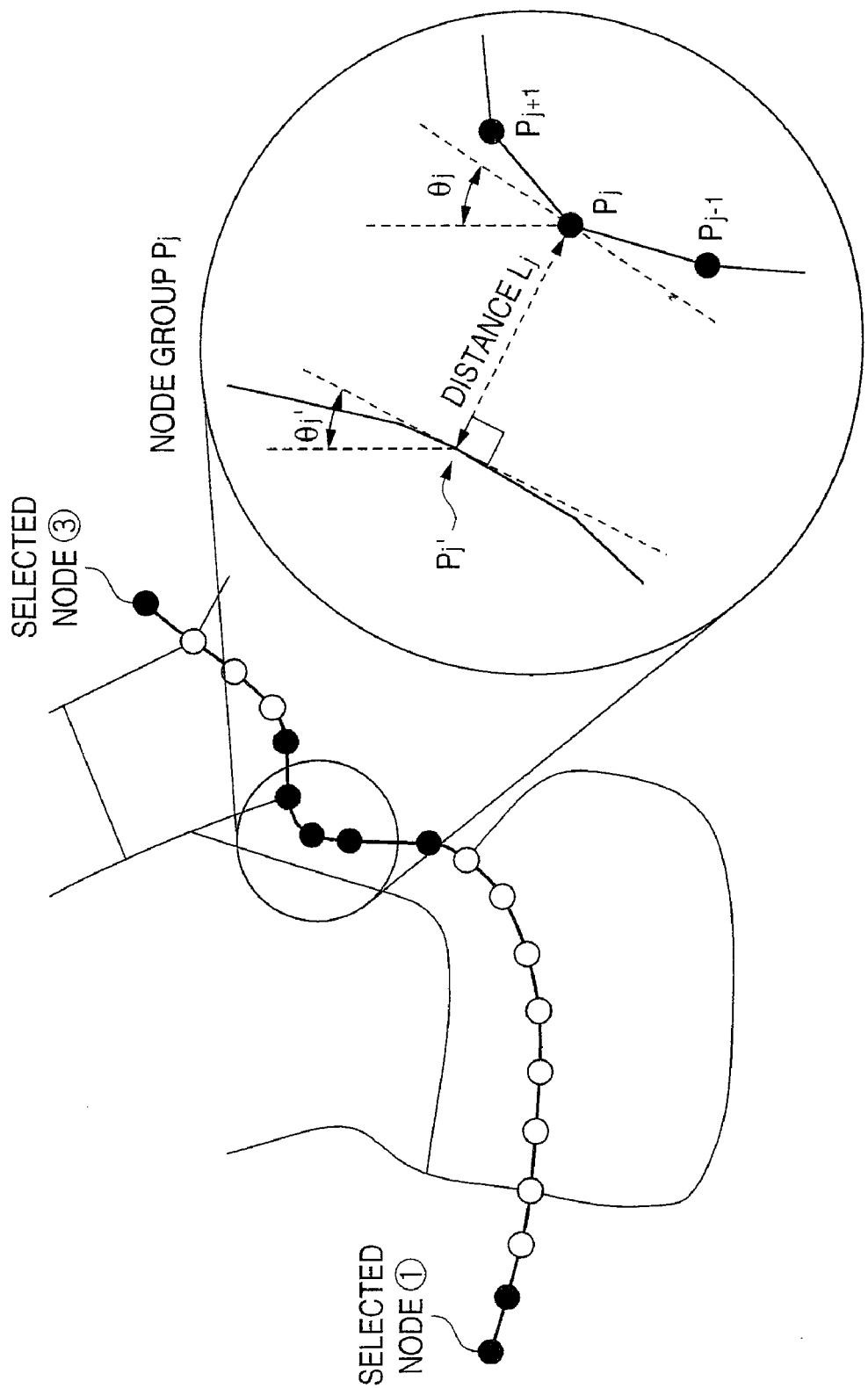

FIG. 20

| |
|---|
| VECTOR DATA TYPE (= ROAD) |
| ONE-WAY TRAFFIC DIRECTION (FORWARD/BACKWARD/NONE) |
| TOTAL NUMBER OF NODES |
| NODE NUMBER p1 |
| NODE 1 ABSOLUTE COORDINATE IN X DIRECTION (LONGITUDE) |
| NODE 1 ABSOLUTE COORDINATE IN Y DIRECTION (LATITUDE) |
| ROAD TYPE BETWEEN NODES p1 AND p2 (= NATIONAL HIGHWAY) |
| ROAD NUMBER BETWEEN NODES p1 AND p2 (= 256) |
| LINK TYPE BETWEEN NODES p1 AND p2 (= MAIN LINE) |
| ▶ SETTING DATE OF DATA BETWEEN NODE p1 AND p2 |
| ▶ SEARCH DISTANCE BETWEEN NODES p1 AND p2 |
| NODE NUMBER p2 |
| NODE 2 RELATIVE COORDINATE IN X DIRECTION (LONGITUDE) |
| NODE 2 RELATIVE COORDINATE IN Y DIRECTION (LATITUDE) |
| ⋮ |
| NODE NUMBER pn |
| NODE n RELATIVE COORDINATE IN X DIRECTION (LONGITUDE) |
| NODE n RELATIVE COORDINATE IN Y DIRECTION (LATITUDE) |

METHOD AND APPARATUS FOR TRANSMITTING POSITION INFORMATION ON A DIGITAL MAP

This patent application is a continuation of U.S. Ser. No. 10/652,257 filed Aug. 29, 2003, which is a continuation of U.S. Ser. No. 10/169,639 filed Jul. 3, 2002.

TECHNICAL FIELD

The present invention relates to a method for transmitting position information on a digital map and apparatus for implementing the method, and in particular to a method and apparatus for accurately transmitting position information on a digital map by using only a small amount of data.

BACKGROUND OF THE INVENTION

In recent years, the number of vehicles that have on-board navigation apparatus has been increasing rapidly. The on-board navigation apparatus maintains a digital map database and is capable of displaying traffic congestion and traffic accident positions on the map based on traffic congestion information and traffic accident information provided by a traffic information center as well as performing a route search using conditions including the aforementioned information.

In Japan, digital map databases are prepared by several companies. The problem is that map data contains errors due to the different base maps and digitizing technologies. The error depends on the digital map from each publisher.

In the traffic information, for example, in case latitude/longitude data of the position is presented alone in order to report for example a traffic accident position, on-board navigation apparatus may identify a different point on the road as a traffic accident position depending on the type of the digital database maintained by the apparatus.

In order to offset such incorrect transmission of information, in the related art, node numbers are defined for nodes such as intersections in a road network and link numbers are defined for links representing roads connecting nodes. A digital map database from each publisher stores intersections and roads in correspondence to node numbers and link numbers. For traffic information, a road number is identified by a link number and a point on the road is displayed in a representation that the road is XX meters away from the start of the link.

However, node numbers and link numbers defined on a road network must be changed to new numbers in case a road is constructed or modified. When a node number or link number is changed, the digital map database from each publisher must be updated. Thus, the method for transmitting position information on a digital map requires a huge cost of maintenance.

In order to solve such problems, the inventor of the invention proposed, in the Japanese Patent Application No. 214068/1999, a system where an information providing side transmits "road shape data" including a coordinate string showing the road shape in the road section of a predetermined length including the on-road position and "relative position data" showing the on-road position in the road section represented by the road shape data in order to report the on-road position, and a receiving side uses the road shape data to perform map matching, identifies the road section on a digital map, and uses the relative position data to identify the on-road position in the road section. The inventor proposed, in the Japanese Patent Application No. 242166/1999, a system where "supplementary information" is also transmitted including the road type, road number, number of crossing links in the road section, crossing link angles and intersection names, and a system where the transmission data amount of "road shape data" is reduced without causing erroneous matching at the receiving side.

In this case, map matching at the receiving side is made for example as follows:

As shown in FIG. 21, when the longitude/latitude data of the point $P_0(x_0, y_0), P_1(x_1, y_1), \ldots, p_k(x_k, y_k)$ is transmitted as $(x_0, y_0) (x_1, y_1), \ldots, (x_k, y_k)$, the receiving side uses the map data read from its digital map database to select roads included in the error range about the point $P_0(x_0, y_0)$ as candidates, and narrows down the candidates by using the transmitted "supplementary information." When a single candidate is finally selected, a position closest to the point $P_0(x_0, y_0)$ and the point $P_k (x_k, y_k)$ on the road is obtained, and the section is assumed as a road section represented by the "road shape data."

When the final candidate is not selected but the roads Q, R are selected as candidates, the points $Q_0, R_0$ on the candidate roads closest to the point $P_0(x_0, y_0)$ are obtained to calculate distance between $P_0$ and $Q_0$ and the distance between $P_0$ and $R_0$. This operation is repeated for each point $P_1 (x_1, y_1), \ldots, P_k (x_k, y_k)$ and a road section where the sum of the root mean square of the distances from each point $P_0, P_1, \ldots, P_k$ is smallest is obtained. This section is assumed as a road section represented by "road shape data" to identify the road section.

The traffic congestion section A-B is identified based on "relative data" transmitted from the start point of the road section obtained from "road shape data."

DISCLOSURE OF THE INVENTION

In the system where road shape data is transmitted, however, how to reduce the transmission data amount without degrading the information accuracy is a major problem. The inventor, in order to reduce the data amount, proposed a system whereby the shape data of the linear road sections is reduced and a system where the curve shape of a road is represented by Fourier coefficients, approximated by arcs, or represented by spline function to compress the data amount. In case, as shown in FIG. 23, the road density is low but the road shape is complicated and an interval between nodes is longer, as on the roads in the mountains, using such a system still requires a large amount of data to represent the road shape.

The invention solves such related art problems and aims at providing a position information transmission method for accurately transmitting a position and a shape on a digital map using a small amount of data and apparatus for implementing the method.

According to the invention, a position information transmission method wherein the transmitting side transmits road shape information to specify the target road section on a digital map and event information to specify an event position by using a relative position in the target road section and the receiving side performs map matching based on the road shape information to identify the target road section and identifies the event position in the target road section based on the event information is characterized in that the transmitting side intermittently selects nodes included in the target road section to include the coordinate data of the nodes in the road shape information for transmission, and that the receiving side performs map matching to determine the positions of the nodes included in the road shape information and obtains the road connecting the nodes by way of a route search to identify the target road section.

The transmitting side evaluates the potential for erroneous matching of the nodes in the target road section at the receiving side, and determines the length of the target road section or the number of nodes to be included in the road shape information.

The present invention also provide a position information transmission apparatus for transmitting road shape information to specify the target road section on a digital map and event information to specify an event position by using a relative position in the target road section. The transmission apparatus is characterized in that the apparatus includes position information converting means for selecting a target road section having the event position and transmit node extracting means for intermittently selecting nodes to be included in the road shape information out of the nodes arranged on the target road section.

The present invention further provide a position information receiving apparatus for receiving road shape information to specify the target road section on a digital map and event information to specify an event position by using a relative position in the target road section is characterized in that the apparatus comprises map matching means for performing map matching to determine the positions of the nodes included in the road shape information and route search means for obtaining the road connecting the nodes determined to reproduce the target road section.

This makes it possible to transmit event positions on a digital map efficiently and accurately with a small data amount thus enhancing the data transmission efficiency.

BRIEF DESCRIPTION OF THE DRAWINGS

FIG. 1 is a schematic view of a position information transmission method according to the first embodiment. FIG. 1(1) shows the processing at the transmission apparatus and FIGS. 1(2), (3) and (5) shows processing at the receiving apparatus. FIG. 1(1) is a schematic view of a process of selecting target roads, (2) selecting nodes to be transmitted, (3) plotting received nodes on the map of the receiving apparatus, (4) calculating the road position on the local map, and (5) connecting the calculated nodes with the shortest route search to determine the target road or section.

FIG. 4(a) represents shape vector data string information for identifying roads and sections. FIG. 4(b) shows various road information represented by a relative distance from each node after the road section is identified. FIG. 4(c) shows an absolute latitude/longitude representation, (c) a lot normalization coordinate representation, and (e) a curvature function representation. FIG. 4(f) explains the deflection angle in the curvature function representation.

FIGS. 5(a) and (b) show other data configuration examples of a position information transmission method according to the first embodiment. FIG. 5(a) shows shape vector data string information with road type or number for identifying roads and sections. FIG. 5(b) shows supplementary information to facilitate identification of nodes.

FIG. 13 shows a data configuration example of a position information transmission method according to the second embodiment and illustrates vector data string information for identifying roads and sections.

FIGS. 14(1), (2), (3), (4), and (5) are schematic views of a position information transmission method according to the third embodiment. FIGS. 14(1) and (2) show processing at the transmission apparatus and (3), (4) and (5) processing on receiving apparatus. FIG. 14(1) is a schematic view of a process of selecting target roads, (2) selecting nodes to be transmitted, (3) plotting received nodes on the map of the receiving apparatus, (4) calculating the road position on the local map, and (5) connecting the calculated nodes with the shortest route search to determine the target road or section.

FIG. 15 shows a data configuration example of a position information transmission method according to the third embodiment and illustrates vector data string information for identifying roads and sections.

FIG. 16 explains the distance to an adjacent road and difference in the intercept azimuth angle used for decision in the position information transmission method according to the third embodiment.

FIG. 20 shows a data configuration example of a position information transmission method according to the fourth embodiment and illustrates vector data string information for identifying roads and sections.

In the figures, numerals 10, 20 represent position information transmission/receiving apparatus, 11, 22 a position information receiver, 12 a map matching section, 13 a route search section, 14 a digital map database, 15 a digital map display section, 16 an event information input section, 17 a position information converter, 18 a transmit node group/supplementary information extracting section, and 19, 21 a position information transmitter.

BEST MODE FOR CARRYING OUT THE INVENTION (First Embodiment)

According to a position information transmission method of the invention, a transmitting side selects a small number of nodes (which may be two points, start point and end point) out of the nodes included in a road section to be transmitted, and transmits the node information. A receiving side performs a map matching to determine the positions of the received nodes and sequentially searches for the shortest routes connecting the nodes, then links the shortest routes to identify the road section.

Figure 2:
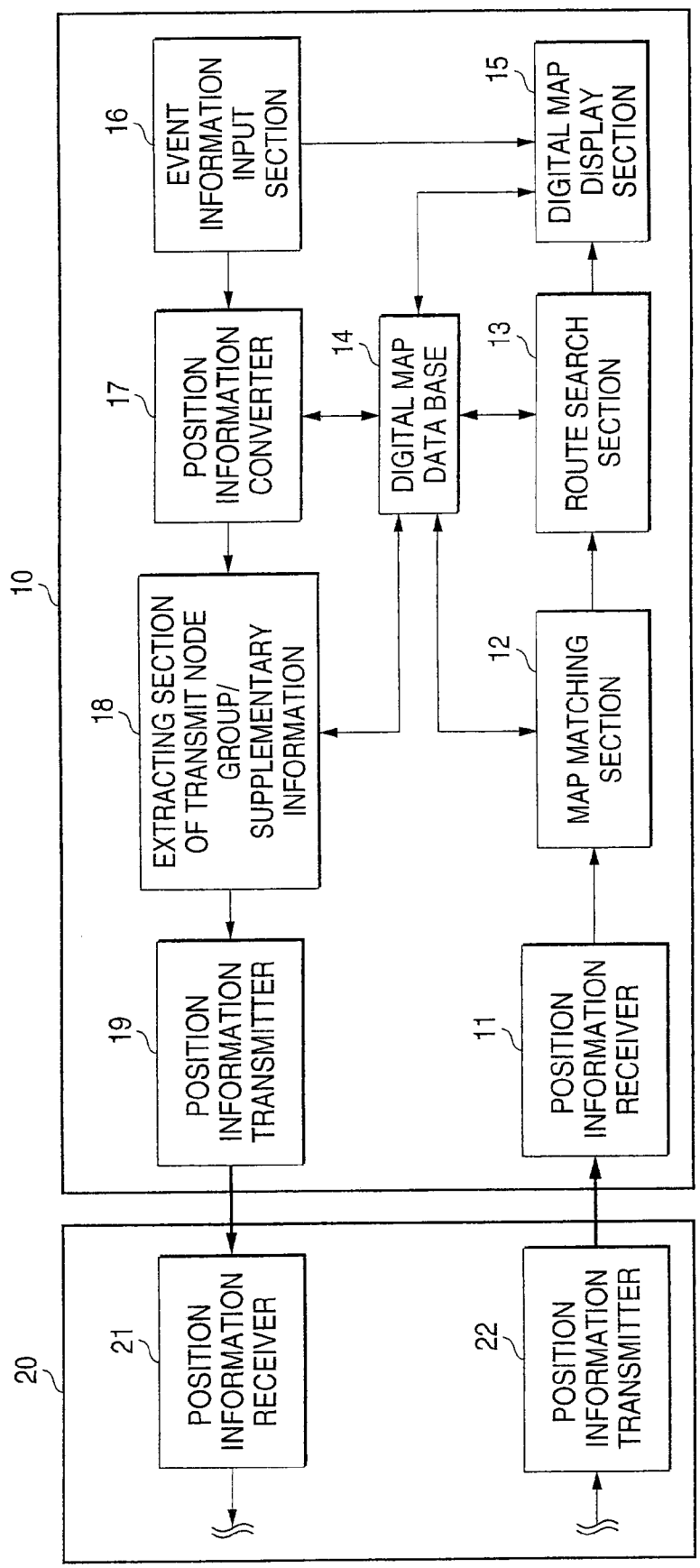
FIG. 2 is a block diagram showing the configuration of position information receiving apparatus according to the first embodiment of the invention.

FIG. 2 shows the configuration of the position information transmission/receiving apparatus 10 that exchanges event information occurring in the jurisdiction with other apparatus 20.

The apparatus 10 includes a position information receiver 11 for receiving position information sent from the position information transmitter 21 of the other apparatus 20, a digital map database 14 for accumulating digital map data, a map matching section 12 for identifying the corresponding node position from the node information included in the received information by using a map matching, a route search section for searching for the shortest routes connecting nodes, a digital map display section 15 for displaying the event position on a map, an event information input section 16 for inputting event information, a position information converter 17 for displaying the event position by using the relative position of the target road section represented by road shape data, a transmit node group/supplementary information extracting section 18 for selecting nodes in the target road section whose node information is to be transmitted and supplementary information to be transmitted, and a position information transmitter 19 for sending the position information on the selected nodes together with the selected supplementary information to the position information receiver 22 of the other apparatus 20.

The digital map database 14 includes node data and link data on a digital map. The node data includes the latitude/longitude coordinate data of nodes, data of node type (identification information such as intersections, entrance and exit of a tunnel, interchange tollgates, road attribute change points, boundaries of prefectures, boundaries of secondary mesh, and landmarks), names, number of connection links to connect to nodes, and connection link angle representing the angle of the connection link. The link data includes data such as the road number, the road type (identification information on national highway, prefectural roads, and municipal roads), the link type (identification information on the main line, interchange entrance/exit, links in an intersection, by roads, connection roads and interlinking roads), presence/absence of traffic prohibition and direction of traffic prohibition, various costs of each link represented by distance or travel time, as well as interpolation point coordinate data representing a link shape. The interpolation points are points set to represent an inter-node road shape. Here, unless otherwise specified, nodes and interpolation points where coordinate data is maintained are called nodes. Node data and link data on a digital map includes rivers, administrative boundaries, contour lines and houses. Node data and link data other than node data of roads has inherent type and attribute code although the configuration is the same as that on roads. Thus the system can be applied to node data and link data other than road data. The coordinate data includes data represented by latitude and longitude, relative latitude/longitude representation with respect to the preceding/subsequent node, normalized coordinate representation in a predetermined section number and curvature function representation (relative polar coordinate representation with respect to the preceding/subsequent node).

Figure 3:
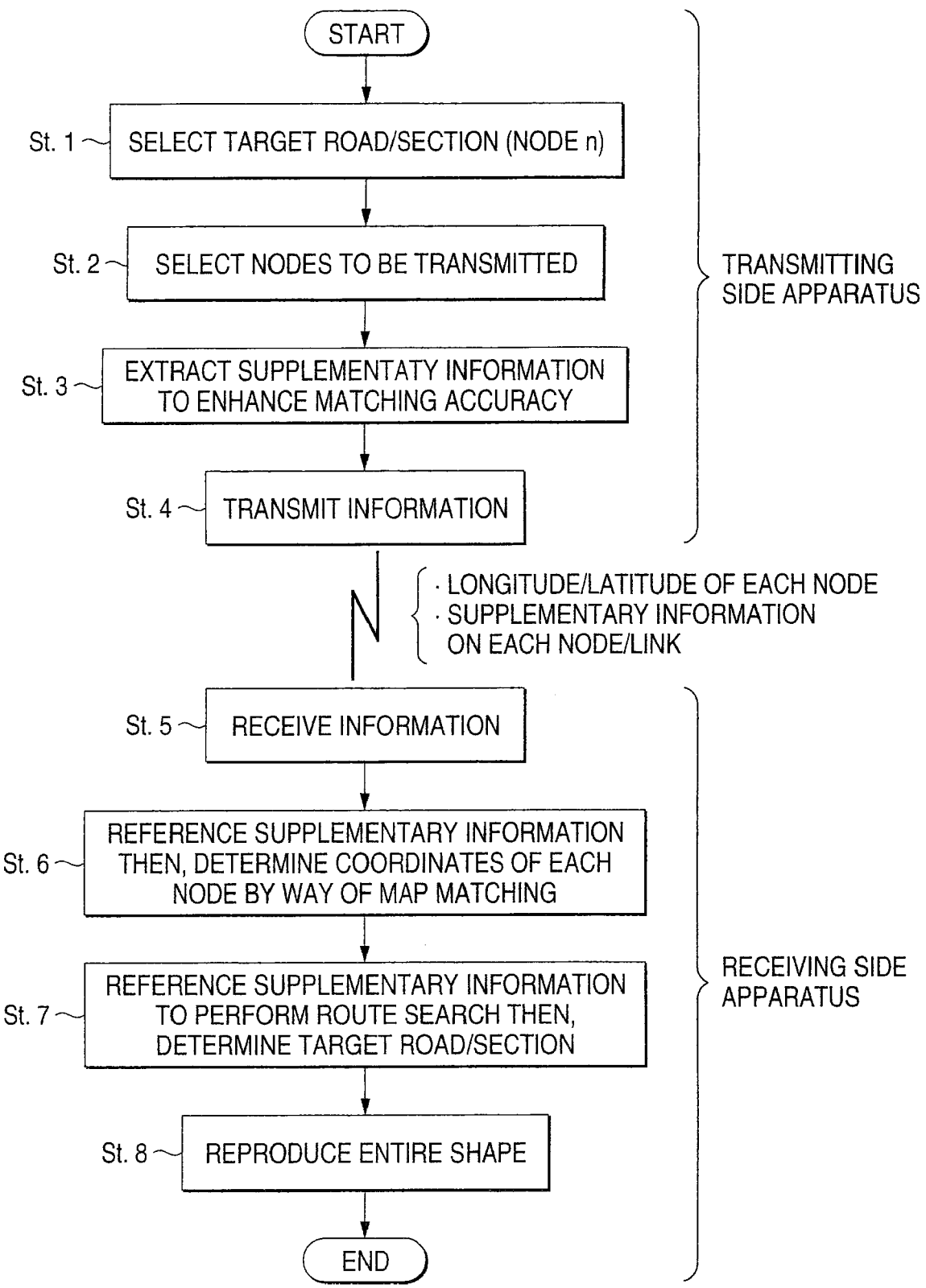
FIG. 3 is a flowchart showing a position information transmission method according to the first embodiment, FIGS. 4(a), (b), (c), (d) and (e) show and example of data configuration in the position information transmission method according to the first embodiment.
Figure 6:
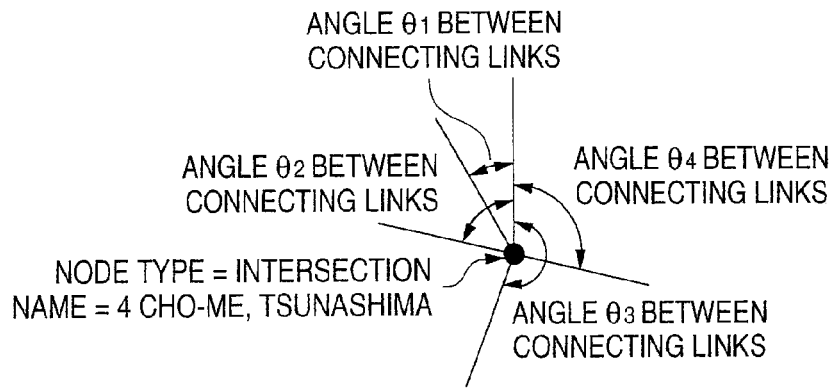
FIG. 6 explains a connection link angle.

FIG. 3 individually shows the processing procedure on the transmitting side and receiving side. FIGS. 1(1), (2), (3), (4), and (5) are schematic views of the individual processing details on a map.

Step 1: When the information to report an event such as a traffic congestion and traffic accident is input from the event information input section 16, the position information converter 17 selects a road section including the event position as a target road section based on the data in the digital map database 14 and generates traffic information displaying the event position by using the relative distance from the reference point of the target road section. FIG. 1(1) shows the selected target road section. Solid filled circles on the target embodiment show the nodes whose coordinate data is maintained in the digital map database 14.

Step 2: The transmit node group/supplementary information extracting section 18 selects nodes whose node information is to be transmitted out of the nodes in the target road section. As shown in FIG. 1(2), the nodes at the start point ($p_1$) and the end point ($p_3$) of the target road section must be selected. The nodes selected may be these two, but may include those selected intermittently, that is, in intervals of several hundreds of meters to several kilometers. In this example, an intermediate node $P_2$ is additionally selected.

Step 3: Information that enhances the accuracy of map matching and a route search is extracted as required as supplementary information out of the node data of the selected nodes and link data of the target road section.

Step 4: The position information transmitter sends shape vector data string information comprising coordinate data of the selected nodes and selected supplementary information to represent the target road section and traffic information to represent the event position by the relative distance from the reference point of the target road section.

FIGS. 4(a), (b), (c) and (d) shows shape vector data string information without supplementary information. FIG. 4(b) shows traffic information including event position information represented by the relative distance from the reference point of the target road section and event detail information. The shape vector data string information may be represented by various coordinate data as mentioned earlier, but may be any data as long as it attains the present application. In the curvature function representation in FIG. 4(e), a deflection angle shown in FIG. 4(f) is used. The following description uses the example of FIG. 4(a). In the relative coordinate representation in FIG. 4(a), the coordinates of the start node is represented by absolute coordinates (longitude/latitude) and the coordinates of the remaining nodes by relative coordinates with respect to the start node (or preceding node in the line of nodes) in order to reduce the data amount. A reference point of the target road section in the traffic information may be the node $p_2$ halfway in the target road section instead of the start point ($p_1$) and end point ($p_3$).

FIG. 5(a) shows shape vector data string information as supplementary information including the link data such as the road type, road number and link type. FIG. 5(b) shows shape vector data string information as supplementary information including the node data such as the node type, node name, number of connecting links of the node, and angle between connecting links. The angle between connecting links is displayed by the angle θ1 to θ4 with respect to the absolute azimuth of the true north (dotted line) at the node (node type=intersection, name=4 cho-me, Tsunashima)

At the receiving side,

Step 5: The position information receiver 11 receives the shape vector data string information and the traffic information.

Step 6: The map matching section 12 uses the data in the digital map database 14 to perform map matching and determines the position of the nodes included in the shape vector data string information. In case the shape vector data string information includes supplementary information, the map matching section 12 uses the supplementary information to execute map matching.

FIG. 1(3) shows the plotting result of the received nodes $p_1$, $p_2$ and $p_3$ on the map of the receiving side. In case the publisher of the digital map data owned by the transmitting side differs from the publisher of the digital map data owned by the receiving side, such a "disposition" occurs frequently.

Figure 7:
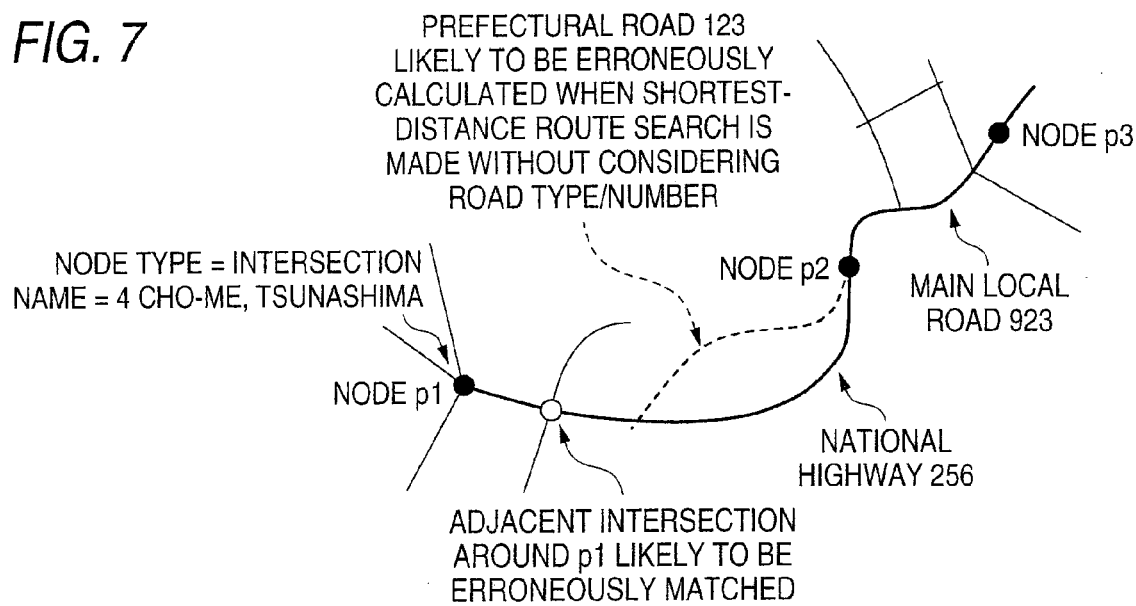
FIG. 7 shows a route search referring to supplementary information by way of a position information transmission method according to the first embodiment.

FIG. 1(4) shows a state where the position of the nodes $p_1'$, $p_2'$ and $p_3'$ corresponding to the nodes $p_1$, $p_2$ and $p_3$ on the map of the receiving side are determined. Even in case a nearby intersection exists that may be cause erroneous matching with $p_1$ around the node $p_1$ as shown in FIG. 7, matching with a correct node position is made possible by referencing supplementary information such as node name.

Step 7: The route search section 13 uses the link cost represented by the distance of the link data in the digital map database 14 to sequentially searches for the shortest route between nodes determined in step 6. In case the shape vector data string information includes the supplementary information on link data, the route search section 13 uses the supplementary information to execute a route search.

Step 8: The shortest routes obtained in step 7 are sequentially linked to reproduce the target road section.

FIG. 1(5) shows a state where the shortest route between the nodes $p_1'$ and $p_2'$ is searched for, and the shortest route between the nodes $p_2'$ and $p_3'$ is searched for, then these routes are linked to determine the target road section from the node $p_1'$ to the node $p_3'$. In case the Prefectural Road 123 (dotted line) bypassing the National Highway 256 (thick solid line) exists as shown in FIG. 7 thus easily causing an error in a search for the shortest routes, it is possible to reproduce the correct target road section by referencing supplementary information such as the road type and road number.

When the target road section is reproduced, the event position is calculated from the reference point of the target road section based on the received traffic information. The event position on the map is then displayed by the digital map display section 15.

When nodes are intermittently selected from the target road section, nodes must be selected so that the positions of the nodes will not cause an error in identifying the node positions or calculation of routes at the receiving side. For example, in FIG. 7, a point where the road type changes from the national highway to the main local road is selected as the node $P_2$. This makes it possible to separately incorporate supplementary information between the nodes $p_1$ and $p_2$ (road type, road number=national highway, 256) and supplementary information between the nodes $p_2$ and $p_3$ (road type, road number=main local road, 923) into the shape vector data string information, thus facilitating reproduction of the target road section at the receiving side.

In this way, only transmission of the information on the nodes intermittently selected from the target road section is required as road shape data to identify the target road section in this position information transmission method. This considerably reduces the transmit data amount compared with the case where coordinate line information on each node in the target road section is transmitted.

By including supplementary information to facilitate node identification and supplementary information to facilitate route identification into the road shape data, the receiving side can perform map matching to accurately determine the node positions and accurately calculate the shortest routes between the nodes, thereby faithfully reproducing the transmitted target road section on the digital map of its own.

This position information transmission method is especially advantageous in transmitting a road shape such as mountain roads with low road density, less intersections and winding in a complicated way.

While an example of position information transmission/receiving apparatus constituting a traffic information provision system is shown as apparatus for implementing the position information transmission method, the receiving arrangement of this apparatus may be implemented in car navigation apparatus so as to provide the car navigation apparatus with the position information receiving feature by this method.

(Second Embodiment)

The second embodiment explains a method for including as supplementary information the intercept azimuth information in the node position in the shape vector data string information in order to enhance the matching accuracy at the receiving side in implementing a position information transmission method of the first embodiment.

Figure 8:
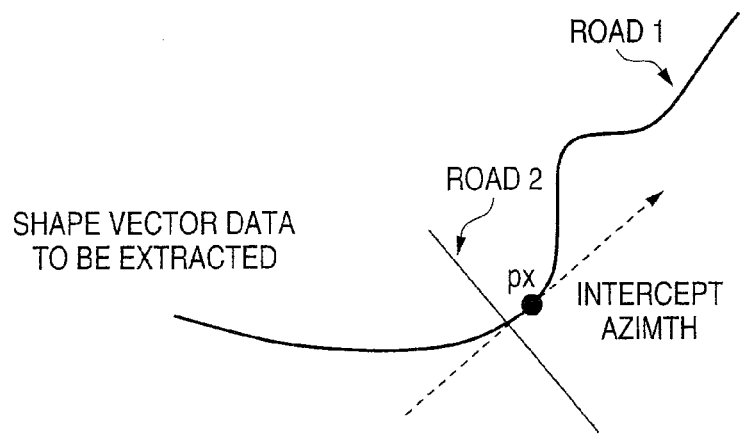
FIG. 8 shows an intercept azimuth to be transmitted from the transmitting side by way of a position information transmission method according to the second embodiment.
Figure 10:
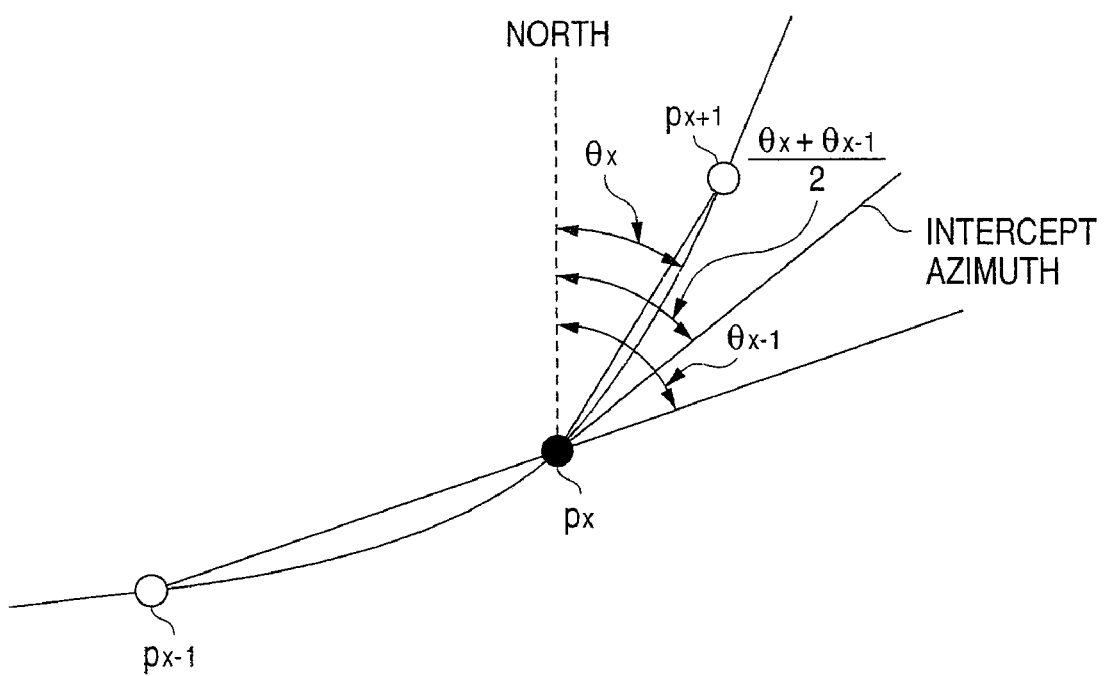
FIG. 10 explains how to obtain the intercept azimuth.

The intercept azimuth in the node position is the azimuth of a tangent to the road curve at the node $p_x$ as shown by the arrow of a dotted line in FIG. 8, and displayed clockwise within the range of 0 to 360 degrees, assuming the absolute azimuth of the true north as 0 degrees. The intercept azimuth of the node $p_x$ is obtained by averaging the azimuth $\theta_{x-1}$ of a line connecting the node $p_{x-1}$ and the node $p_{x-1}$ and the azimuth $\theta_x$ of a straight line connecting the node $p_x$ and the node $p_{x+1}$ where $p_{x-1}$ is an upstream node adjacent to the node $p_x$ and $p_{x+1}$ is a downstream node adjacent to the node $p_x$ as shown in FIG. 10:

$$(\theta_{x-1}+\theta_x)/2 \qquad \text{(Formula 1)}$$

Figure 11:
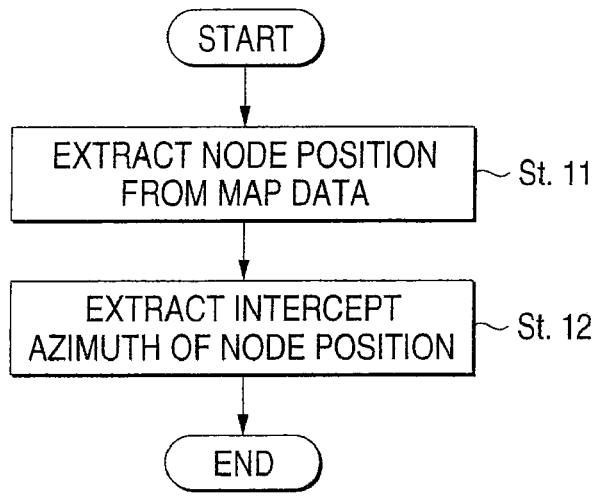
FIG. 11 shows a processing flow at the transmitting side in a position information transmission method according to the second embodiment.

FIG. 11 shows the procedure for the transmitting side to obtain the intercept azimuth of a node selected from the target road section.

Step 11: The transmitting side obtains the coordinate data of a selected node and its upstream and downstream adjacent nodes from the digital map database.

Step 12: The transmitting side calculates the azimuths of straight lines connecting the nodes and uses (Formula 1) to obtain the intercept azimuth of the selected node.

FIG. 13 shows shape vector data string information including the information on the intercept azimuths of the nodes selected from the target road section as supplementary information. Here, the intercept azimuth of the start node ($p_1$) is displayed in absolute azimuth and the intercept azimuths of the remaining nodes in relative azimuth with respect to the immediately preceding nodes included in the shape vector data string information, in order to reduce the data amount.

Figure 12:
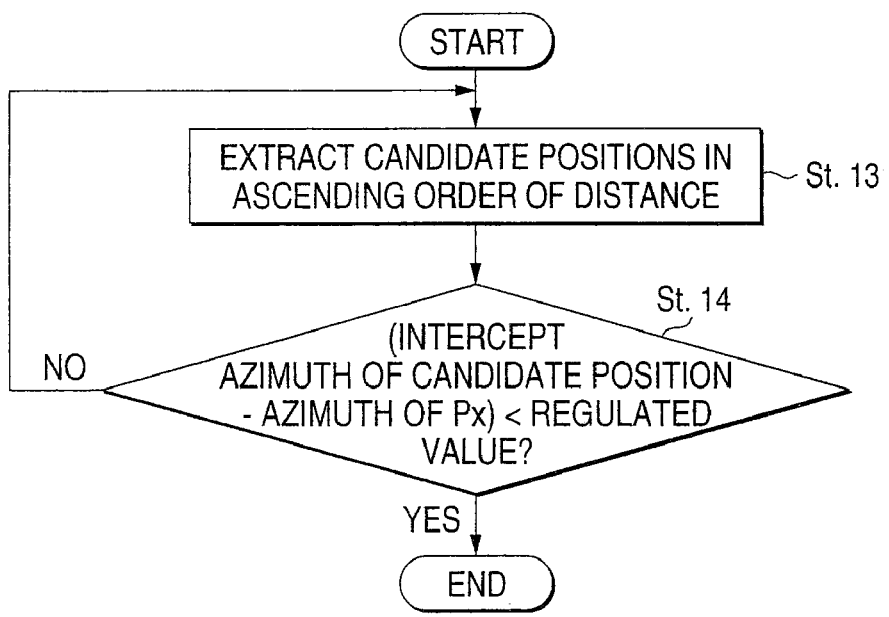
FIG. 12 shows a map matching flow at the receiving side in a position information transmission method according to the second embodiment.

The receiving side receives the shape vector data string information and uses the information on the intercept azimuth to perform map matching. FIG. 12 shows the map matching procedure.

Step 13: The receiving side uses the data in the receiving side digital map database to extract positions on the road close to the longitude/latitude data of the node $p_x$ as candidates for matching in the increasing order of the distance to the node $p_x$.

Step 14: The receiving side obtains the coordinates of the adjacent node of the candidate position from the digital map database to calculate the intercept azimuth of the candidate position. Then the receiving side obtains the difference between the calculated intercept azimuth and the intercept azimuth of the node $p_x$ sent in the supplementary information. In case the difference is smaller than the regulated value, the receiving side determines the candidate position as a selected node.

In case the difference is larger than the regulated value, the receiving side excludes the candidate position from candidates for matching. Execution returns to step 13 and the receiving side extracts the next closest position as a candidate for matching and follows step 14.

In this way, it is possible to prevent erroneous matching by referencing the azimuth information on the node position.

Figure 9:
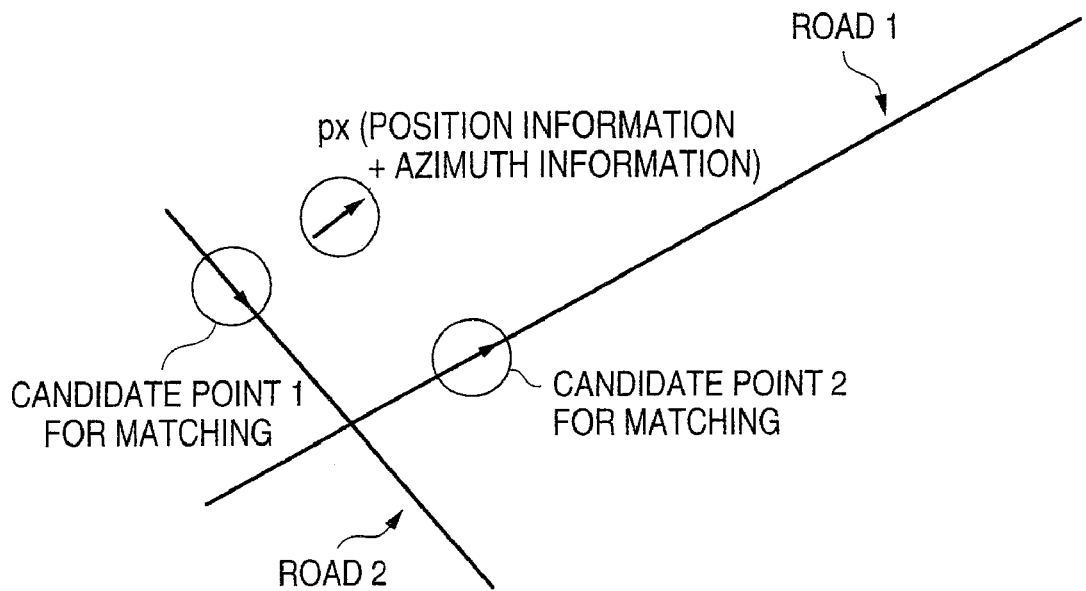
FIG. 9 explains map matching at the receiving side in a position information transmission method according to the second embodiment.

In FIG. 8, the node $p_x$ on the road 1 is likely to be erroneously matched with the road 1 passing near the point $p_x$ and crossing the road 1. In matching, as shown in FIG. 9, the receiving side could set the point on the road 2 closest to the point $p_x$ as a candidate point 1 for matching and the point on the road 2 next closest to the point $p_x$ as a candidate point 2 for matching. The candidate point 1 is excluded from candidates matching because the difference between the intercept azimuth of the candidate point 1 and that of the node $p_x$ exceeds the regulated value. The candidate point 2 is determined as a selected node because the difference between the intercept azimuth of the candidate point 2 and that of the node $p_x$ is below the regulated value.

In this practice, erroneous matching of the candidate point 1 on a different road as a selected node results in an error in the calculation of routes in the subsequent route search, thus making it impossible to reproduce the target road section.

A position information transmission method of this embodiment includes as supplementary information the information on the intercept azimuth at the node position into the shape vector data string information. This prevents inadvertent setting of a node point on a road crossing the target road thus enhancing the matching accuracy.

(Third Embodiment)

The third embodiment explains a method for increasing the number of transmit nodes at road points where the receiving side is likely to commit erroneous matching thus enhancing the matching accuracy at the receiving side in implementing a position information transmission method of the first embodiment.

FIGS. 14(1), (2), (3), (4), and (5) are schematic views of the processing details in the position information transmission method on the map.

The transmitting side, as shown in FIG. 14(1), selects a target road section, then the nodes to be transmitted out of the nodes in the target road section. In this practice, the transmitting side selects a plurality of nodes (node group) for easy identification of the different shape of the adjacent road at sections, where the receiving side is likely to commit erroneous matching due to presence of an adjacent road, which is parallel to the target road.

The transmitting side transmits shape vector data string information comprising the coordinate data of selected nodes and supplementary information together with traffic information.

FIG. 15 illustrates the shape vector data string information. In this example, a transmit node includes n node groups, the node group 1 has m nodes, ..., the node group n has s nodes. While the coordinate data of nodes included in each node group is arranged in order in this shape vector data string information, the road shape represented by a plurality of nodes in individual node groups may be represented by Fourier coefficients, approximated by arcs and straight lines, or represented by spline function to compress the data amount.

Meanwhile, the receiving side that has received plots the node positions of the nodes in each node group included in the shape vector data string information on the map of the receiving side as shown in FIG. 14(3), then performs a map matching in order to calculate the position of each node on the map of the receiving side as shown in FIG. 14(4).

In this practice, by providing matching between the shape represented by the arrangement of a plurality of nodes in a node group and the road shape on the map of the receiving side, it is possible to accurately obtain the position of each node on the map of the receiving side.

When the node position is determined, the receiving side sequentially searches for the shortest routes connecting the nodes intermittently located, then links the shortest routes to reproduce the target road section, as shown in FIG. 14(5).

In this position information transmission method, the transmitting side selects nodes to be included in a node group based on the following criteria:

(1) As shown in FIG. 16, when the distance $L_j$ from the node $p_j$ to the closest position $p_j'$ is short and the difference $(\Delta\theta_j = \theta_j - \theta_j')$ between the intercept azimuth angle $\theta_j$ at the node $p_j$ and the intercept azimuth angle $\theta_j'$ at the node $p_j'$ is small, the node $p_j$ is determined as a node likely to be erroneously matched at the receiving side.

For example, the decision value $\epsilon_j$ is defined as $$\epsilon_j = \alpha \times L_j + \beta \times |\Delta\theta_j| \qquad \text{(Formula 2)}$$

(where $\alpha$ and $\beta$ are predetermined coefficients.)
and when $\epsilon_j$ is smaller than the regulated value $\epsilon_0$, the node $p_j$ is determined as a node likely to be erroneously matched at the receiving side.

(2) When the node $p_j$ is a node likely to be erroneously matched, it is determined whether the nodes before and after the node $p_j$ are nodes likely to be erroneously matched at the receiving side based on the criterion under (1) and the range of nodes to be determined is sequentially expanded until a node unlikely to be erroneously matched at the receiving side is found. When a node unlikely to be erroneously matched at the receiving side, that is, a node satisfying $\epsilon_j \geq \epsilon_0$ is found, it is assumed that a shape that identifies itself from the adjacent road shape is obtained and the node as well as the nodes satisfying $\epsilon_j < \epsilon_0$ are employed as members of a node group.

Figure 17:
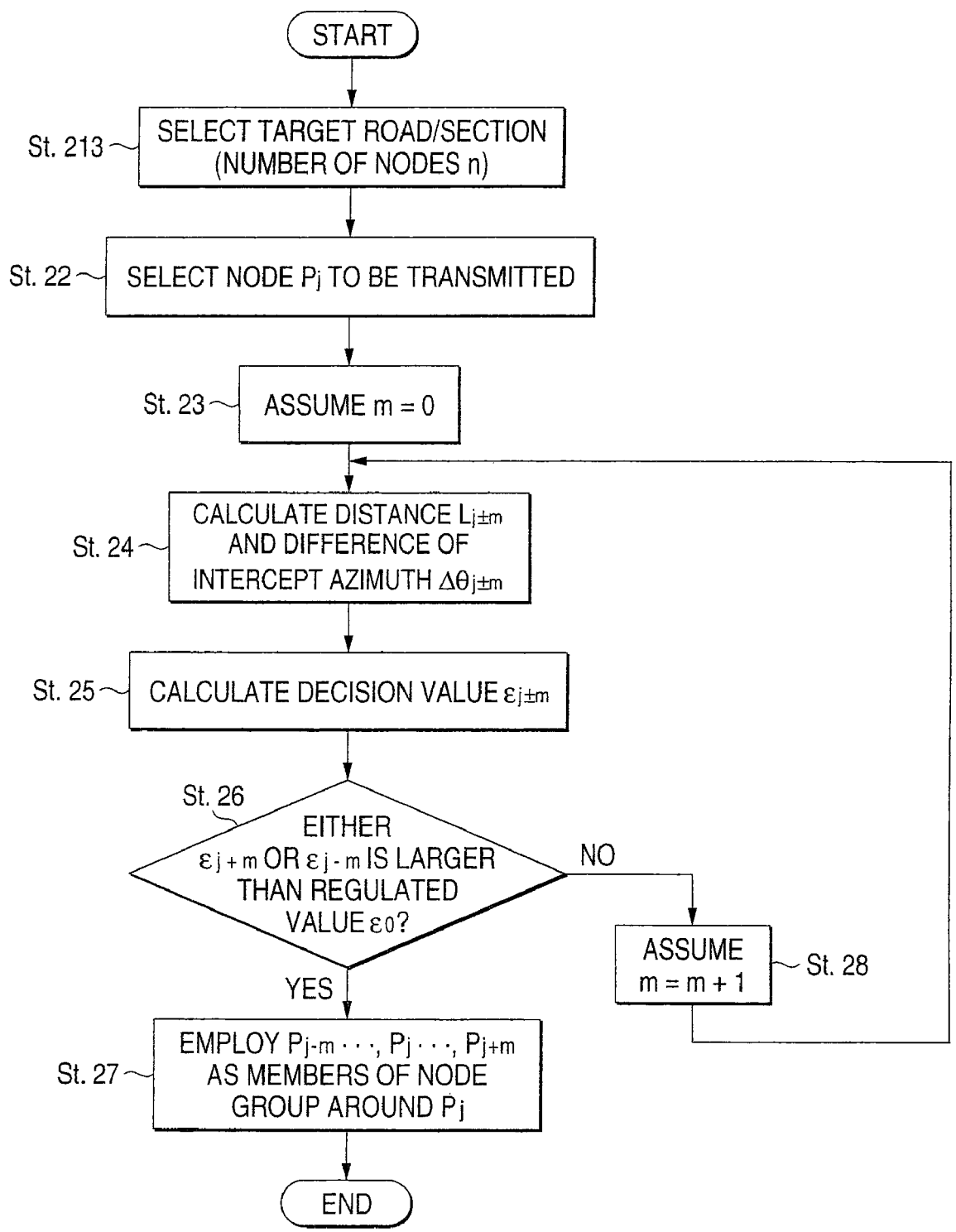
FIG. 17 shows a processing flow in a position information transmission method according to the third embodiment.

FIG. 17 shows an example of a procedure for selecting nodes to be included in a node group.

Step 21: The target road section is selected.
Step 22: The node $p_j$ to be transmitted is selected.
Step 23: Assume m=0.
Step 24: The distance $L_{j\pm m}$ to the adjacent road and the difference of intercept azimuth angle $\Delta\theta_{j\pm m}$ are calculated.
Step 25: The decision values $\epsilon_{j\pm m}$ is calculated by using (Formula 2).
Step 26: When both $\epsilon_{j-m}$ and $\epsilon_{j+m}$ are smaller than the regulated value $\epsilon_0$,
Step 28: Procedure from step 24 is repeated as assuming m=m+1.
When either $\epsilon_{j-m}$ or $\epsilon_{j+m}$ is larger than the regulated value $\epsilon_0$,
Step 27: $P_{j-m}, \ldots, P_j, \ldots, P_{j+m}$ are employed as members of a node group around $P_j$.

In this way, this procedure evaluates the potential for erroneous matching of nodes at the receiving side based on the distance from a node to an adjacent road and the difference between the intercept azimuth at the node and the intercept azimuth at the closest point on the adjacent road, and selects the nodes to be included in a node group depending on the evaluation value.

The transmitting side evaluates the potential for erroneous matching of nodes at the receiving side. The transmitting side transmits more nodes at road points where the receiving side is likely to commit erroneous matching thus enhancing the matching accuracy at the receiving side and faithfully reproducing the target road section.

The approach for evaluating the potential for erroneous matching of nodes at the receiving side based on the distance from a node to an adjacent road and the difference of the intercept azimuth can be applied to a method for transmitting "road shape data" comprising shape vector data strings as mentioned under "Background of the Invention." It is possible to determine the length of the road shape specified by shape vector data strings and the number of nodes to be included into the shape vector data strings depending on the evaluation value.

(Fourth Embodiment)

The fourth embodiment explains a method for supporting a case where the digital map data maintained by the receiving side is of an earlier version.

In a position information transmission method according to the first through third embodiments, the receiving side obtains the shortest routes between nodes by way of a route search in order to reproduce the target road section. Thus the roads not included in the digital map database at the receiving side cannot be reproduced. For example, in case the digital map data at the receiving side is of an earlier version and does not include the data of a road recently opened for traffic, it is impossible to connect intermittent nodes specified by the transmitting side by using this road. As a result, the target road section intended by the transmitting side is different from that reproduced by the receiving side. This will cause the receiving side to assume by mistake that an event is present on another road.

In fact, such a trouble occurs frequently in case the transmitting side is information provision means of a traffic information provision system and the receiving side is car navigation apparatus provided with traffic information.

The fourth embodiment explains a position information transmission method for avoiding such a situation.

In this method, the transmitting side identifies the date when the digital map data of the target road was set, and selects the type of the position information transmission method used depending on the setting date. Setting date to a digital map database for the road substantially overlaps the opening period of the road. For example, when the target road has just been opened for traffic, the car navigation apparatus having the digital map database including the data of the new road is very small in number. In this case, the transmitting side employs a position information transmission method that will avoid misunderstanding that an event is present on a road other than the target road, not to mention identify the target road, even when the car navigation apparatus has a digital map database not including the data of the new road, in order to deliver traffic information.

In case the data setting date for the road is defined in each road link in the digital map database, the transmitting side employs the date. Otherwise, the transmitting side compares the versions of the digital map data and calculates the setting date from the revision date of the version that first carries the road link.

The transmitting side includes the information representing the setting date of data of the target road and the information on the distance between nodes in the shape vector data string information.

The receiving side references the setting date of data of the target road in the shape vector data string information received. When the receiving side has determined that the data of the target road is not included in the digital map database of its own, it stops reproducing the target road section.

In case the distance of the shortest route between nodes is extremely different from the distance between nodes included in the shape vector data string information, the receiving side determines that the data of the target road is not included in the digital map database of its own, and stops reproducing the target road section.

Figure 18:
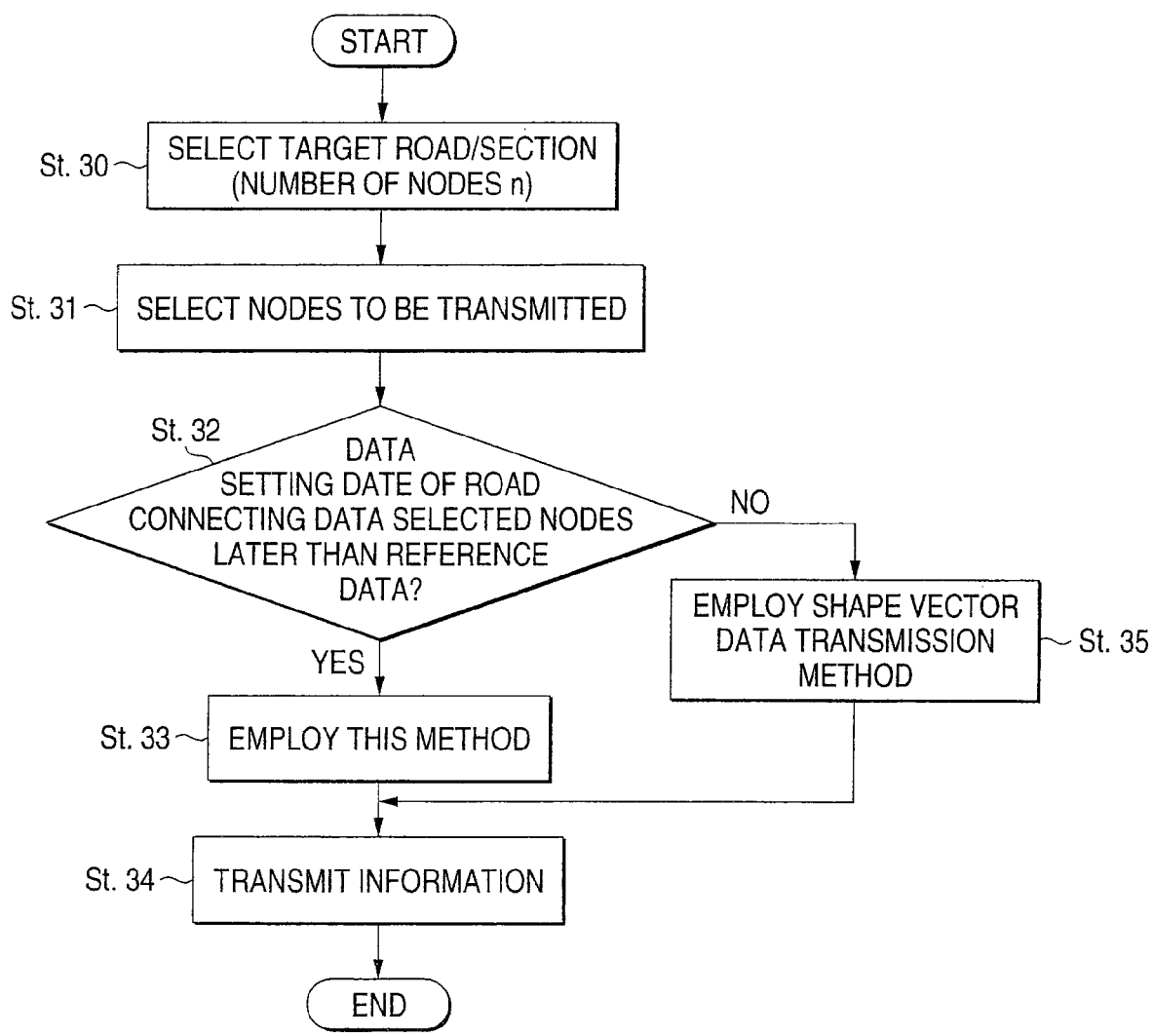
FIG. 18 shows a processing flow at the transmission apparatus in a position information transmission method according to the fourth embodiment.

The flowchart of FIG. 18 shows the procedure at the transmitting side.

Step 30: The transmitting side selects the target road section.

Step 31: The transmitting side selects nodes to be transmitted.

Step 32: When the data setting date of the data of the road connecting the selected nodes is equal to or earlier than the reference date (regulated value), Step 33: The transmitting side employs a position information transmission method according to the first through third embodiments.

In case the data setting date of the data of the road connecting the selected nodes is later than the reference date, Step 35: The transmitting side employs a position information transmission method for transmitting data that directly represents the road shape of the target road section (such as coordinate data string on each node to identify the road shape).

Step 36: The transmitting side transmits the position information based on the selected method.

FIG. 20 illustrates shape vector data string information to be transmitted using a method of the invention.

This information includes the setting date of data of the roads connecting nodes and search distance data.

Figure 19:
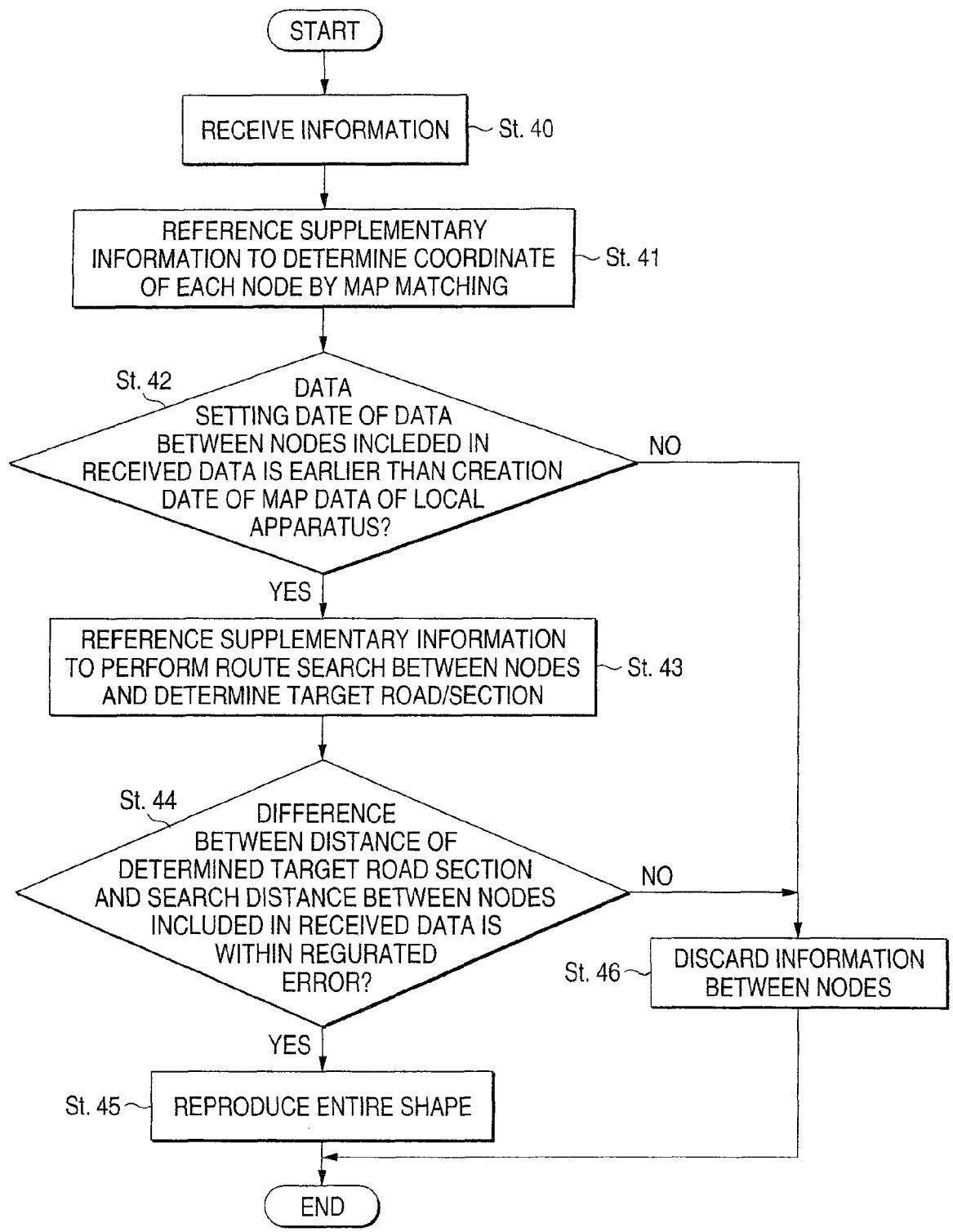
FIG. 19 shows a processing flow at the receiving apparatus in a position information transmission method according to the fourth embodiment.
Figure 21:
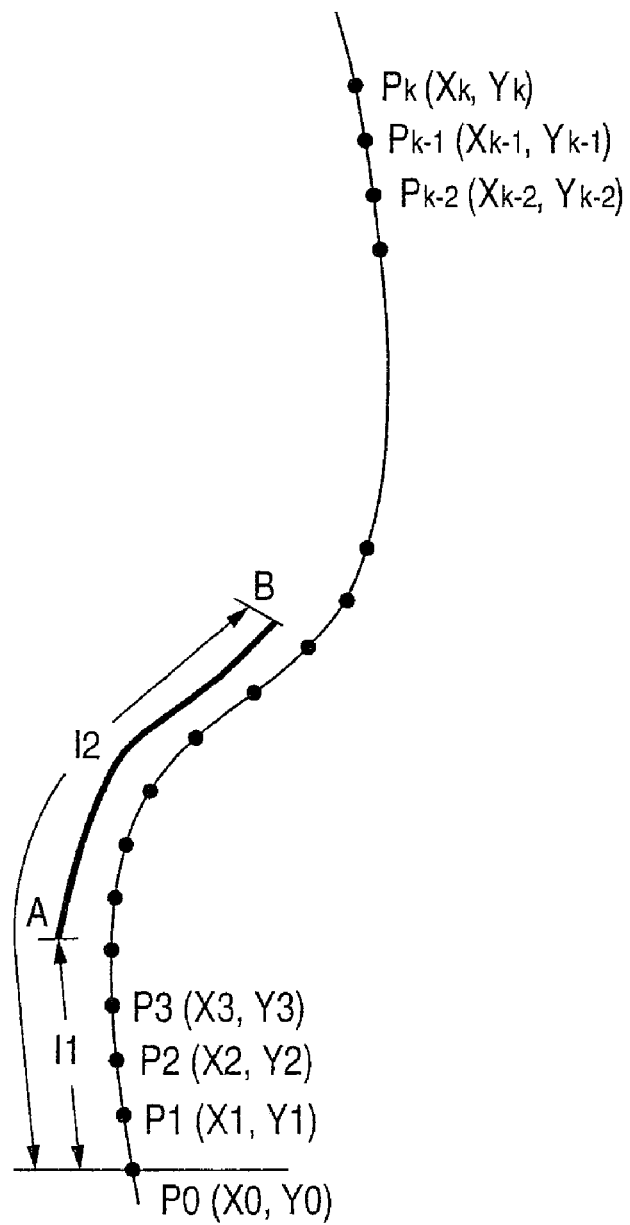
FIG. 21 explains an example of map matching.
Figure 22:
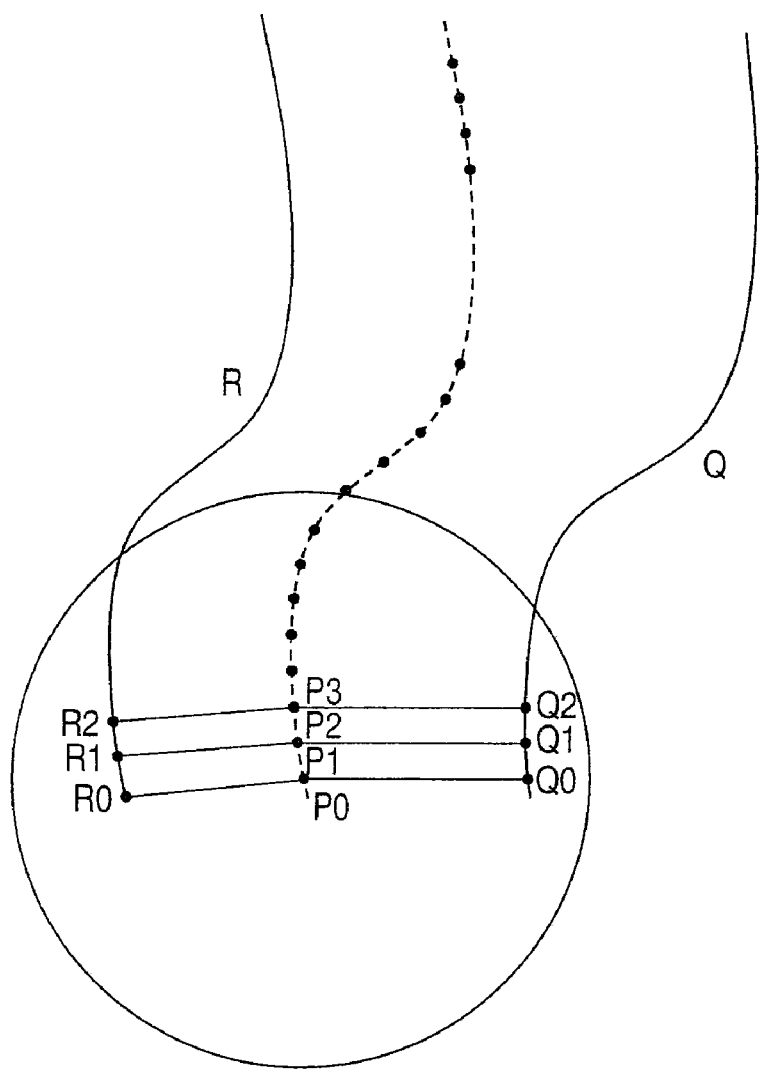
FIG. 22 explains road shape data and relative position information.
Figure 23:
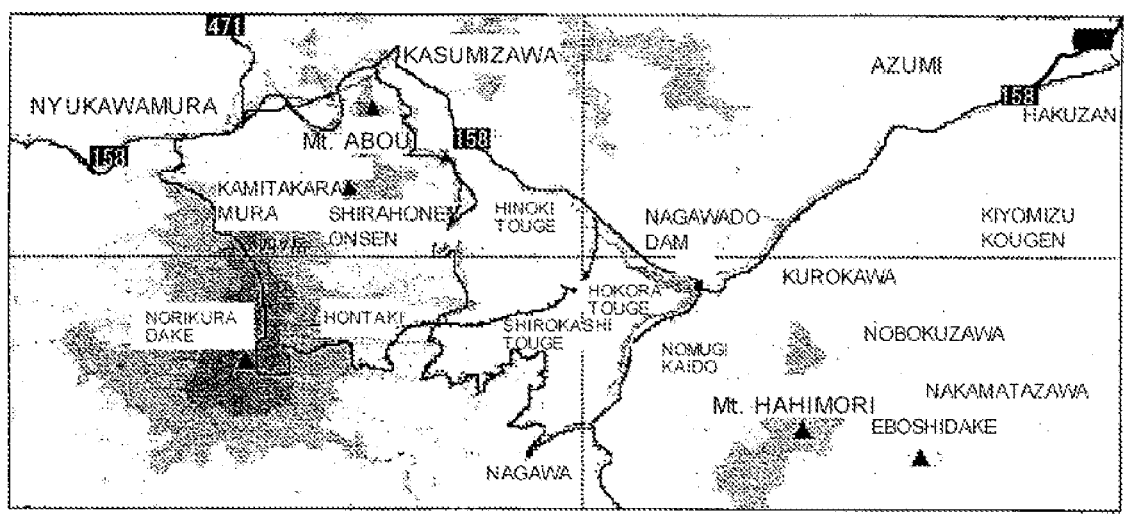
FIG. 23 is a printout photo of a map showing the road shape in the mountains.

The flowchart of FIG. 19 shows the procedure at the receiving side that has received the shape vector data string information.

Step 40: The receiving side receives the information.

Step 41: The receiving side references the supplementary information to determine the coordinates of each node by way of map matching.

Step 42: The receiving side identifies whether the data setting date of the data between nodes included in the received data is earlier than the creation date of map data of the local apparatus, and in case it is earlier, Step 43: The receiving side references the supplementary information to perform a route search between nodes and determine the target road section.

Step 44: The receiving side identifies whether the difference between the distance of the determined target road section and the search distance between nodes included in the received data is within the regulated error, and in case it is within the regulated error, Step 45: The receiving side reproduces the entire shape of the target road section.

In case the data setting date is not earlier than the creation date of map data of the local apparatus in Step 42, or in case the difference between the distance of the determined target road section and the search distance between nodes included in the received data is not within the regulated error, the receiving side discards the information between the nodes.

By following this procedure, it is possible to avoid transmission of erroneous position information caused by different versions of the digital map data maintained by the transmitting side and the receiving side when a position information transmission method according to the invention is applied.

While both the setting date of data of roads connecting nodes and data of the search distance are included in the shape vector data string information in the foregoing description, either data may be included.

While the invention has been described in detail referring to particular embodiments, those skilled in the art will appreciate that the invention may be modified or corrected in various forms without departing from the spirit and the scope of the invention.

This application is based on the Japanese Patent Application No. 020082/2001 filed Jan. 29, 2001, which is incorporated herein by reference.

<Industrial Applicability>

As understood from the foregoing description, according to a method for transmitting position information on a digital map and apparatus for implementing the method, it is possible to efficiently and accurately transmit the information on the shape and position on a digital map using a small amount of data, thereby enhancing the data transmission efficiency.

What is claimed is:

1. A method for identifying a position of a road section on digital maps, each map containing errors, the digital maps including a first digital map and a second digital map, the second digital map showing the road section at a different position from the first digital map due to the errors, said method comprising the steps of:
at a transmitting side having the first digital map,
selecting nodes from the road section on the first digital map on a predetermined condition;
creating position information of the road section on the first digital map by using coordinate information of the selected nodes and distance information between the nodes;
sending said position information of the road section;
at a receiving side having the second digital map,
receiving said position information of the road section;
determining positions on the second digital map, which correspond to the positions indicated by the coordinate information included in the received position information;
executing a route search between the determined positions using the distance information between the selected nodes indicated by the coordinate information included in the received position information;
identifying a position of the road section on the second digital map, which is different from a position of the road section on the first digital map due to the errors, as the position of the route acquired by said executing a route search step.

2. The method according to claim 1,
said selecting step includes selecting at least start node and end node of the road section.

3. The method according to claim 1,
said executing a route search step is searching the shortest route between positions of said selected nodes.

4. The method according to claim 1,
said position information includes coordinate information of a node on a intersection.

5. The method according to claim 1, wherein a number of the selected nodes is less than a number of intersections included in the road section.

6. The method according to claim 1, wherein the selected nodes include nodes of a start point and an end point of the road section, and intermediate nodes which do not cause an error in identifying positions of the intermediate nodes or executing said route search at the receiving side.

7. A system for providing information indicating a road section on a first digital map to a receiving apparatus having a second digital map so that the receiving apparatus can identify the road section on the second digital map,
wherein each map containing errors, the digital maps including a first digital map and a second digital map, the second digital map showing the road section at a different position from the first digital map due to the errors,
said apparatus comprising:
at a transmitting apparatus having the first digital map,
means for selecting nodes from the road section on the first digital map on a predetermined condition;
means for creating position information of the road section on the first digital map by using coordinate information of the selected nodes and distance information between the nodes;
means for sending said position information of the road section;
at the receiving apparatus having the second digital map,
means for receiving said position information of the road section;
means for determining positions on the second digital map, which correspond to the positions indicated by the coordinate information included in the received position information;
means for executing a route search between the determined positions using the distance information between the selected nodes indicated by the coordinate information included in the received position information;
means for identifying a position of the road section on the second digital map, which is different from a position of the road section on the first digital map due to the errors, as the position of the route acquired by said route search.

8. A transmitting apparatus adapted for operating as the transmitting apparatus of the system according to claim 7.

9. A receiving apparatus adapted for operating as the receiving apparatus of the system according to claim 7.

10. A method for transmitting position information of a road section including coordinate information of nodes and distance information between the nodes from a transmitting apparatus having a first digital map to a receiving apparatus having a second digital map which shows the road section at a different position from the first digital map due to errors, wherein the receiving apparatus executes a route search using the distance information between the nodes indicated by the coordinate information included in the position information received from the transmitting apparatus to identify a position of the road section on the second digital map, which is different from a position of the road section on the first digital map due to the errors, as the position of the route acquired by said route search,
said method comprising the steps of:
selecting nodes from the road section on the first digital map on a predetermined condition;
creating the position information of the road section on the first digital map by using the coordinate information of the selected nodes and the distance information between the nodes;
sending said position information of the road section including the distance information between the nodes.

11. The method according to claim 10, wherein a number of the selected nodes is less than a number of intersections included in the road section.

12. The method according to claim 10, wherein the selected nodes include nodes of a start point and an end point of the road section, and intermediate nodes which do not cause an error in identifying positions of the intermediate nodes or executing said route search at the receiving side.

* * * * *